(12) United States Patent
Gravois et al.

(10) Patent No.: US 9,378,584 B2
(45) Date of Patent: Jun. 28, 2016

(54) SYSTEMS AND METHODS FOR RENDERING VIRTUAL TRY-ON PRODUCTS

(71) Applicant: Glasses.com Inc.

(72) Inventors: Adam Gravois, Austin, TX (US); Ryan Engle, Pflugerville, TX (US)

(73) Assignee: GLASSES.COM INC., Mason, OH (US)

(*) Notice: Subject to any disclaimer, the term of this patent is extended or adjusted under 35 U.S.C. 154(b) by 331 days.

(21) Appl. No.: 13/774,958

(22) Filed: Feb. 22, 2013

(65) Prior Publication Data

US 2013/0314410 A1    Nov. 28, 2013

Related U.S. Application Data

(60) Provisional application No. 61/650,983, filed on May 23, 2012, provisional application No. 61/735,951, filed on Dec. 11, 2012.

(51) Int. Cl.
*G06T 17/00* (2006.01)
*G06T 19/00* (2011.01)
*G06T 15/04* (2011.01)
(Continued)

(52) U.S. Cl.
CPC ............ *G06T 17/00* (2013.01); *G06K 9/00221* (2013.01); *G06K 9/46* (2013.01); *G06T 15/04* (2013.01); *G06T 19/00* (2013.01); *G06T 19/006* (2013.01); *G02C 13/003* (2013.01); *G06T 2210/16* (2013.01)

(58) Field of Classification Search
CPC ....... G06T 15/04; G06T 15/005; G09G 5/363
See application file for complete search history.

(56) References Cited

U.S. PATENT DOCUMENTS 3,927,933 A    12/1975    Humphrey
4,370,058 A    1/1983    Trötscher et al.
(Continued)

FOREIGN PATENT DOCUMENTS

DE    10007705 A1    9/2001
EP    0092364 A1    10/1983
(Continued)

OTHER PUBLICATIONS

PCT International Search Report for PCT International Patent Application No. PCT/US2012/068174, mailed Mar. 7, 2013.
(Continued)

*Primary Examiner* — Maurice L McDowell, Jr.
*Assistant Examiner* — Raffi Isanians
(74) *Attorney, Agent, or Firm* — Holland & Hart LLP

(57) ABSTRACT

A computer-implemented method for rendering virtual try-on products is described. A first render viewpoint is selected of a virtual 3-D space that includes a 3-D model of at least a portion of a user generated from an image of the user and a 3-D polygon mesh of an object. Polygons of the 3-D polygon mesh are designated as backwards-facing polygons and front-facing polygon in relation to the first render viewpoint. A shadow texture map of the object is applied to the 3-D model of the user. A transparency texture map of the object is applied to the backwards-facing polygon of the 3-D polygon mesh of the object. A first color texture map of the object is applied to the result of the application of the transparency texture map to the backwards-facing polygon. The virtual 3-D space is rendered at the first render viewpoint.

40 Claims, 13 Drawing Sheets

(51) Int. Cl.
*G06K 9/46* (2006.01)
*G06K 9/00* (2006.01)
*G02C 13/00* (2006.01)

(56) References Cited

U.S. PATENT DOCUMENTS

| | | |
|---|---|---|
| 4,467,349 A | 8/1984 | Maloomian |
| 4,522,474 A | 6/1985 | Slavin |
| 4,534,650 A | 8/1985 | Clerget et al. |
| 4,539,585 A | 9/1985 | Spackova et al. |
| 4,573,121 A | 2/1986 | Saigo et al. |
| 4,613,219 A | 9/1986 | Vogel |
| 4,698,564 A | 10/1987 | Slavin |
| 4,724,617 A | 2/1988 | Logan et al. |
| 4,730,260 A | 3/1988 | Mori et al. |
| 4,781,452 A | 11/1988 | Ace |
| 4,786,160 A | 11/1988 | Fürter |
| 4,845,641 A | 7/1989 | Ninomiya et al. |
| 4,852,184 A | 7/1989 | Tamura et al. |
| 4,957,369 A | 9/1990 | Antonsson |
| 5,139,373 A | 8/1992 | Logan et al. |
| 5,255,352 A | 10/1993 | Falk |
| 5,257,198 A | 10/1993 | van Schoyck |
| 5,280,570 A | 1/1994 | Jordan |
| 5,281,957 A | 1/1994 | Schoolman |
| 5,428,448 A | 6/1995 | Albert-Garcia |
| 5,485,399 A | 1/1996 | Saigo et al. |
| 5,550,602 A | 8/1996 | Braeuning |
| 5,592,248 A | 1/1997 | Norton et al. |
| 5,631,718 A | 5/1997 | Markovitz et al. |
| 5,666,957 A | 9/1997 | Juto |
| 5,682,210 A | 10/1997 | Weirich |
| 5,720,649 A | 2/1998 | Gerber et al. |
| 5,724,522 A | 3/1998 | Kagami et al. |
| 5,774,129 A | 6/1998 | Poggio et al. |
| 5,809,580 A | 9/1998 | Arnette |
| 5,844,573 A | 12/1998 | Poggio et al. |
| 5,880,806 A | 3/1999 | Conway |
| 5,908,348 A | 6/1999 | Gottschald |
| 5,974,400 A | 10/1999 | Kagami et al. |
| 5,980,037 A | 11/1999 | Conway |
| 5,983,201 A | 11/1999 | Fay |
| 5,987,702 A | 11/1999 | Simioni |
| 5,988,862 A | 11/1999 | Kacyra et al. |
| D417,883 S | 12/1999 | Arnette |
| 6,016,150 A * | 1/2000 | Lengyel et al. ............... 345/426 |
| 6,018,339 A | 1/2000 | Stevens |
| D420,037 S | 2/2000 | Conway |
| D420,379 S | 2/2000 | Conway |
| D420,380 S | 2/2000 | Simioni et al. |
| 6,024,444 A | 2/2000 | Little |
| D421,764 S | 3/2000 | Arnette |
| D422,011 S | 3/2000 | Conway |
| D422,014 S | 3/2000 | Simioni et al. |
| D423,034 S | 4/2000 | Arnette |
| D423,552 S | 4/2000 | Flanagan et al. |
| D423,553 S | 4/2000 | Brune |
| D423,554 S | 4/2000 | Conway |
| D423,556 S | 4/2000 | Conway |
| D423,557 S | 4/2000 | Conway |
| D424,094 S | 5/2000 | Conway |
| D424,095 S | 5/2000 | Brune et al. |
| D424,096 S | 5/2000 | Conway |
| D424,589 S | 5/2000 | Arnette |
| D424,598 S | 5/2000 | Simioni |
| D425,542 S | 5/2000 | Arnette |
| D425,543 S | 5/2000 | Brune |
| D426,568 S | 6/2000 | Conway |
| D427,225 S | 6/2000 | Arnette |
| D427,227 S | 6/2000 | Conway |
| 6,072,496 A | 6/2000 | Guenter et al. |
| 6,095,650 A | 8/2000 | Gao et al. |
| 6,102,539 A | 8/2000 | Tucker |
| D430,591 S | 9/2000 | Arnette |
| D432,156 S | 10/2000 | Conway et al. |
| D433,052 S | 10/2000 | Flanagan |
| 6,132,044 A | 10/2000 | Sternbergh |
| 6,139,141 A | 10/2000 | Zider |
| 6,139,143 A | 10/2000 | Brune et al. |
| 6,142,628 A | 11/2000 | Saigo |
| 6,144,388 A | 11/2000 | Bornstein |
| D434,788 S | 12/2000 | Conway |
| D439,269 S | 3/2001 | Conway |
| 6,208,347 B1 | 3/2001 | Migdal et al. |
| 6,222,621 B1 | 4/2001 | Taguchi |
| 6,231,188 B1 | 5/2001 | Gao et al. |
| 6,233,049 B1 | 5/2001 | Kondo et al. |
| 6,246,468 B1 | 6/2001 | Dimsdale |
| 6,249,600 B1 | 6/2001 | Reed et al. |
| 6,281,903 B1 | 8/2001 | Martin et al. |
| 6,305,656 B1 | 10/2001 | Wemyss |
| 6,307,568 B1 | 10/2001 | Rom |
| 6,310,627 B1 | 10/2001 | Sakaguchi |
| 6,330,523 B1 | 12/2001 | Kacyra et al. |
| 6,356,271 B1 | 3/2002 | Reiter et al. |
| 6,377,281 B1 | 4/2002 | Rosenbluth et al. |
| 6,386,562 B1 | 5/2002 | Kuo |
| 6,415,051 B1 | 7/2002 | Callari et al. |
| 6,419,549 B2 | 7/2002 | Shirayanagi |
| 6,420,698 B1 | 7/2002 | Dimsdale |
| 6,434,278 B1 | 8/2002 | Hashimoto |
| 6,456,287 B1 | 9/2002 | Kamen et al. |
| 6,466,205 B2 | 10/2002 | Simpson et al. |
| 6,473,079 B1 | 10/2002 | Kacyra et al. |
| 6,492,986 B1 | 12/2002 | Metaxas et al. |
| 6,493,073 B2 | 12/2002 | Epstein |
| 6,508,553 B2 | 1/2003 | Gao et al. |
| 6,512,518 B2 | 1/2003 | Dimsdale |
| 6,512,993 B2 | 1/2003 | Kacyra et al. |
| 6,516,099 B1 | 2/2003 | Davison et al. |
| 6,518,963 B1 | 2/2003 | Waupotitsch et al. |
| 6,527,731 B2 | 3/2003 | Weiss et al. |
| 6,529,192 B1 | 3/2003 | Waupotitsch |
| 6,529,626 B1 | 3/2003 | Watanabe et al. |
| 6,529,627 B1 | 3/2003 | Callari et al. |
| 6,533,418 B1 | 3/2003 | Izumitani et al. |
| 6,535,223 B1 | 3/2003 | Foley |
| 6,556,196 B1 | 4/2003 | Blanz et al. |
| 6,563,499 B1 | 5/2003 | Waupotitsch et al. |
| 6,583,792 B1 | 6/2003 | Agnew |
| 6,624,843 B2 | 9/2003 | Lennon |
| 6,634,754 B2 | 10/2003 | Fukuma et al. |
| 6,637,880 B1 | 10/2003 | Yamakaji et al. |
| 6,647,146 B1 | 11/2003 | Davison et al. |
| 6,650,324 B1 | 11/2003 | Junkins |
| 6,659,609 B2 | 12/2003 | Mothes |
| 6,661,433 B1 | 12/2003 | Lee |
| 6,664,956 B1 | 12/2003 | Erdem |
| 6,668,082 B1 | 12/2003 | Davison et al. |
| 6,671,538 B1 | 12/2003 | Ehnholm et al. |
| 6,677,946 B1 | 1/2004 | Ohba |
| 6,682,195 B2 | 1/2004 | Dreher |
| 6,692,127 B2 | 2/2004 | Abitbol et al. |
| 6,705,718 B2 | 3/2004 | Fossen |
| 6,726,463 B2 | 4/2004 | Foreman |
| 6,734,849 B2 | 5/2004 | Dimsdale et al. |
| 6,736,506 B2 | 5/2004 | Izumitani et al. |
| 6,760,488 B1 | 7/2004 | Moura et al. |
| 6,775,128 B2 | 8/2004 | Leitao |
| 6,785,585 B1 | 8/2004 | Gottschald |
| 6,791,584 B1 | 9/2004 | Xie |
| 6,792,401 B1 | 9/2004 | Nigro et al. |
| 6,807,290 B2 | 10/2004 | Liu et al. |
| 6,808,381 B2 | 10/2004 | Foreman et al. |
| 6,817,713 B2 | 11/2004 | Ueno |
| 6,825,838 B2 | 11/2004 | Smith et al. |
| 6,847,383 B2 | 1/2005 | Agnew |
| 6,847,462 B1 | 1/2005 | Kacyra et al. |
| 6,876,755 B1 | 4/2005 | Taylor et al. |
| 6,893,245 B2 | 5/2005 | Foreman et al. |
| 6,903,746 B2 | 6/2005 | Fukushima et al. |
| 6,907,310 B2 | 6/2005 | Gardner et al. |
| 6,922,494 B1 | 7/2005 | Fay |
| 6,943,789 B2 | 9/2005 | Perry et al. |

(56) References Cited

U.S. PATENT DOCUMENTS

| | | | |
|---|---|---|---|
| 6,944,327 B1 | 9/2005 | Soatto |
| 6,950,804 B2 | 9/2005 | Strietzel |
| 6,961,439 B2 | 11/2005 | Ballas |
| 6,965,385 B2 | 11/2005 | Welk et al. |
| 6,965,846 B2 | 11/2005 | Krimmer |
| 6,968,075 B1 | 11/2005 | Chang |
| 6,980,690 B1 | 12/2005 | Taylor et al. |
| 6,999,073 B1 | 2/2006 | Zwern et al. |
| 7,003,515 B1 | 2/2006 | Glaser et al. |
| 7,016,824 B2 | 3/2006 | Waupotitsch et al. |
| 7,034,818 B2 | 4/2006 | Perry et al. |
| 7,043,059 B2 | 5/2006 | Cheatle et al. |
| 7,051,290 B2 | 5/2006 | Foreman et al. |
| 7,062,722 B1 | 6/2006 | Carlin et al. |
| 7,069,107 B2 | 6/2006 | Ueno |
| 7,095,878 B1 | 8/2006 | Taylor et al. |
| 7,103,211 B1 | 9/2006 | Medioni et al. |
| 7,116,804 B2 | 10/2006 | Murase et al. |
| 7,133,048 B2 | 11/2006 | Brand |
| 7,152,976 B2 | 12/2006 | Fukuma et al. |
| 7,154,529 B2 | 12/2006 | Hoke et al. |
| 7,156,655 B2 | 1/2007 | Sachdeva et al. |
| 7,184,036 B2 | 2/2007 | Dimsdale et al. |
| 7,209,557 B2 | 4/2007 | Lahiri |
| 7,212,656 B2 | 5/2007 | Liu et al. |
| 7,212,664 B2 | 5/2007 | Lee et al. |
| 7,215,430 B2 | 5/2007 | Kacyra et al. |
| 7,218,323 B1 * | 5/2007 | Halmshaw et al. ............ 345/424 |
| 7,219,995 B2 | 5/2007 | Ollendorf et al. |
| 7,224,357 B2 | 5/2007 | Chen et al. |
| 7,234,937 B2 | 6/2007 | Sachdeva et al. |
| 7,242,807 B2 | 7/2007 | Waupotitsch et al. |
| 7,290,201 B1 | 10/2007 | Edwards |
| 7,310,102 B2 | 12/2007 | Spicer |
| 7,324,110 B2 | 1/2008 | Edwards et al. |
| 7,415,152 B2 | 8/2008 | Jiang et al. |
| 7,421,097 B2 | 9/2008 | Hamza et al. |
| 7,426,292 B2 | 9/2008 | Moghaddam et al. |
| 7,434,931 B2 | 10/2008 | Warden et al. |
| 7,436,988 B2 | 10/2008 | Zhang et al. |
| 7,441,895 B2 | 10/2008 | Akiyama et al. |
| 7,450,737 B2 | 11/2008 | Ishikawa et al. |
| 7,489,768 B1 | 2/2009 | Strietzel |
| 7,492,364 B2 | 2/2009 | Devarajan et al. |
| 7,508,977 B2 | 3/2009 | Lyons et al. |
| 7,523,411 B2 | 4/2009 | Carlin |
| 7,530,690 B2 | 5/2009 | Divo et al. |
| 7,532,215 B2 | 5/2009 | Yoda et al. |
| 7,533,453 B2 | 5/2009 | Yancy |
| 7,540,611 B2 | 6/2009 | Welk et al. |
| 7,557,812 B2 | 7/2009 | Chou et al. |
| 7,563,975 B2 | 7/2009 | Leahy et al. |
| 7,573,475 B2 | 8/2009 | Sullivan et al. |
| 7,573,489 B2 | 8/2009 | Davidson et al. |
| 7,587,082 B1 | 9/2009 | Rudin et al. |
| 7,609,859 B2 | 10/2009 | Lee et al. |
| 7,630,580 B1 | 12/2009 | Repenning |
| 7,634,103 B2 | 12/2009 | Rubinstenn et al. |
| 7,643,685 B2 | 1/2010 | Miller |
| 7,646,909 B2 | 1/2010 | Jiang et al. |
| 7,651,221 B2 | 1/2010 | Krengel et al. |
| 7,656,402 B2 | 2/2010 | Abraham et al. |
| 7,657,083 B2 | 2/2010 | Parr et al. |
| 7,663,648 B1 | 2/2010 | Saldanha et al. |
| 7,665,843 B2 | 2/2010 | Xie |
| 7,689,043 B2 | 3/2010 | Austin et al. |
| 7,699,300 B2 | 4/2010 | Iguchi |
| 7,711,155 B1 | 5/2010 | Sharma et al. |
| 7,717,708 B2 | 5/2010 | Sachdeva et al. |
| 7,720,285 B2 | 5/2010 | Ishikawa et al. |
| D616,918 S | 6/2010 | Rohrbach |
| 7,736,147 B2 | 6/2010 | Kaza et al. |
| 7,755,619 B2 | 7/2010 | Wang et al. |
| 7,756,325 B2 | 7/2010 | Vetter et al. |
| 7,760,923 B2 | 7/2010 | Walker et al. |
| 7,768,528 B1 | 8/2010 | Edwards et al. |
| D623,216 S | 9/2010 | Rohrbach |
| 7,804,997 B2 | 9/2010 | Geng et al. |
| 7,814,436 B2 | 10/2010 | Schrag et al. |
| 7,830,384 B1 | 11/2010 | Edwards et al. |
| 7,835,565 B2 | 11/2010 | Cai et al. |
| 7,835,568 B2 | 11/2010 | Park et al. |
| 7,845,797 B2 | 12/2010 | Warden et al. |
| 7,848,548 B1 | 12/2010 | Moon et al. |
| 7,852,995 B2 | 12/2010 | Strietzel |
| 7,856,125 B2 | 12/2010 | Medioni et al. |
| 7,860,225 B2 | 12/2010 | Strietzel |
| 7,860,301 B2 | 12/2010 | Se et al. |
| 7,876,931 B2 | 1/2011 | Geng |
| 7,896,493 B2 | 3/2011 | Welk et al. |
| 7,907,774 B2 | 3/2011 | Parr et al. |
| 7,929,745 B2 | 4/2011 | Walker et al. |
| 7,929,775 B2 | 4/2011 | Hager et al. |
| 7,953,675 B2 | 5/2011 | Medioni et al. |
| 7,961,914 B1 | 6/2011 | Smith |
| 8,009,880 B2 | 8/2011 | Zhang et al. |
| 8,026,916 B2 | 9/2011 | Wen |
| 8,026,917 B1 | 9/2011 | Rogers et al. |
| 8,026,929 B2 | 9/2011 | Naimark |
| 8,031,909 B2 | 10/2011 | Se et al. |
| 8,031,933 B2 | 10/2011 | Se et al. |
| 8,059,917 B2 | 11/2011 | Dumas et al. |
| 8,064,685 B2 | 11/2011 | Solem et al. |
| 8,070,619 B2 | 12/2011 | Edwards |
| 8,073,196 B2 | 12/2011 | Yuan et al. |
| 8,090,160 B2 | 1/2012 | Kakadiaris et al. |
| 8,113,829 B2 | 2/2012 | Sachdeva et al. |
| 8,118,427 B2 | 2/2012 | Bonnin et al. |
| 8,126,242 B2 | 2/2012 | Brett et al. |
| 8,126,249 B2 | 2/2012 | Brett et al. |
| 8,126,261 B2 | 2/2012 | Medioni et al. |
| 8,130,225 B2 | 3/2012 | Sullivan et al. |
| 8,131,063 B2 | 3/2012 | Xiao et al. |
| 8,132,123 B2 | 3/2012 | Schrag et al. |
| 8,144,153 B1 | 3/2012 | Sullivan et al. |
| 8,145,545 B2 | 3/2012 | Rathod et al. |
| 8,155,411 B2 | 4/2012 | Hof et al. |
| 8,160,345 B2 | 4/2012 | Pavlovskaia et al. |
| 8,177,551 B2 | 5/2012 | Sachdeva et al. |
| 8,182,087 B2 | 5/2012 | Esser et al. |
| 8,194,072 B2 | 6/2012 | Jones et al. |
| 8,199,152 B2 | 6/2012 | Sullivan et al. |
| 8,200,502 B2 | 6/2012 | Wedwick |
| 8,204,299 B2 | 6/2012 | Arcas et al. |
| 8,204,301 B2 | 6/2012 | Xiao et al. |
| 8,204,334 B2 | 6/2012 | Bhagavathy et al. |
| 8,208,717 B2 | 6/2012 | Xiao et al. |
| 8,212,812 B2 | 7/2012 | Tsin et al. |
| 8,217,941 B2 | 7/2012 | Park et al. |
| 8,218,836 B2 | 7/2012 | Metaxas et al. |
| 8,224,039 B2 | 7/2012 | Ionita et al. |
| 8,243,065 B2 | 8/2012 | Kim |
| 8,248,417 B1 | 8/2012 | Clifton |
| 8,260,006 B1 | 9/2012 | Callari et al. |
| 8,260,038 B2 | 9/2012 | Xiao et al. |
| 8,260,039 B2 | 9/2012 | Shiell et al. |
| 8,264,504 B2 | 9/2012 | Naimark |
| 8,269,779 B2 | 9/2012 | Rogers et al. |
| 8,274,506 B1 | 9/2012 | Rees |
| 8,284,190 B2 | 10/2012 | Muktinutalapati et al. |
| 8,286,083 B2 | 10/2012 | Barrus et al. |
| 8,289,317 B2 | 10/2012 | Harvill |
| 8,290,769 B2 | 10/2012 | Taub et al. |
| 8,295,589 B2 | 10/2012 | Ofek et al. |
| 8,300,900 B2 | 10/2012 | Lai et al. |
| 8,303,113 B2 | 11/2012 | Esser et al. |
| 8,307,560 B2 | 11/2012 | Tulin |
| 8,330,801 B2 | 12/2012 | Wang et al. |
| 8,346,020 B2 | 1/2013 | Guntur |
| 8,355,079 B2 | 1/2013 | Zhang et al. |
| 8,372,319 B2 | 2/2013 | Liguori et al. |
| 8,374,422 B2 | 2/2013 | Roussel |
| 8,385,646 B2 | 2/2013 | Lang et al. |
| 8,391,547 B2 | 3/2013 | Huang et al. |

(56) References Cited

U.S. PATENT DOCUMENTS

| | | | |
|---|---|---|---|
| 8,459,792 | B2 | 6/2013 | Wilson |
| 8,605,942 | B2 | 12/2013 | Takeuchi |
| 8,605,989 | B2 | 12/2013 | Rudin et al. |
| 8,743,051 | B1 | 6/2014 | Moy et al. |
| 8,813,378 | B2 | 8/2014 | Grove |
| 2001/0023413 | A1 | 9/2001 | Fukuma et al. |
| 2001/0026272 | A1 | 10/2001 | Feld et al. |
| 2001/0051517 | A1 | 12/2001 | Strietzel |
| 2002/0010655 | A1 | 1/2002 | Kjallstrom |
| 2002/0105530 | A1 | 8/2002 | Waupotitsch et al. |
| 2002/0149585 | A1 | 10/2002 | Kacyra et al. |
| 2003/0001835 | A1 | 1/2003 | Dimsdale et al. |
| 2003/0030904 | A1 | 2/2003 | Huang |
| 2003/0071810 | A1 | 4/2003 | Shoov et al. |
| 2003/0110099 | A1 | 6/2003 | Trajkovic et al. |
| 2003/0112240 | A1 | 6/2003 | Cerny |
| 2004/0004633 | A1 | 1/2004 | Perry et al. |
| 2004/0090438 | A1 | 5/2004 | Alliez et al. |
| 2004/0217956 | A1 | 11/2004 | Besl et al. |
| 2004/0223631 | A1 | 11/2004 | Waupotitsch et al. |
| 2004/0257364 | A1 | 12/2004 | Basler |
| 2005/0053275 | A1 | 3/2005 | Stokes |
| 2005/0063582 | A1 | 3/2005 | Park et al. |
| 2005/0111705 | A1 | 5/2005 | Waupotitsch et al. |
| 2005/0128211 | A1 | 6/2005 | Berger et al. |
| 2005/0162419 | A1 | 7/2005 | Kim et al. |
| 2005/0190264 | A1 | 9/2005 | Neal |
| 2005/0208457 | A1 | 9/2005 | Fink et al. |
| 2005/0226509 | A1 | 10/2005 | Maurer et al. |
| 2006/0012748 | A1 | 1/2006 | Periasamy et al. |
| 2006/0017887 | A1 | 1/2006 | Jacobson et al. |
| 2006/0067573 | A1 | 3/2006 | Parr et al. |
| 2006/0127852 | A1 | 6/2006 | Wen |
| 2006/0161474 | A1 | 7/2006 | Diamond et al. |
| 2006/0212150 | A1 | 9/2006 | Sims, Jr. |
| 2006/0216680 | A1 | 9/2006 | Buckwalter et al. |
| 2007/0013873 | A9 | 1/2007 | Jacobson et al. |
| 2007/0104360 | A1 | 5/2007 | Huang et al. |
| 2007/0127848 | A1 | 6/2007 | Kim et al. |
| 2007/0160306 | A1 | 7/2007 | Ahn et al. |
| 2007/0183679 | A1 | 8/2007 | Moroto et al. |
| 2007/0233311 | A1 | 10/2007 | Okada et al. |
| 2007/0262988 | A1 | 11/2007 | Christensen |
| 2008/0084414 | A1 | 4/2008 | Rosel et al. |
| 2008/0112610 | A1 | 5/2008 | Israelsen et al. |
| 2008/0136814 | A1 | 6/2008 | Chu et al. |
| 2008/0152200 | A1 | 6/2008 | Medioni et al. |
| 2008/0162695 | A1 | 7/2008 | Muhn et al. |
| 2008/0163344 | A1 | 7/2008 | Yang |
| 2008/0170077 | A1 | 7/2008 | Sullivan et al. |
| 2008/0201641 | A1 | 8/2008 | Xie |
| 2008/0219589 | A1 | 9/2008 | Jung et al. |
| 2008/0240588 | A1 | 10/2008 | Tsoupko-Sitnikov et al. |
| 2008/0246759 | A1 | 10/2008 | Summers |
| 2008/0271078 | A1 | 10/2008 | Gossweiler et al. |
| 2008/0278437 | A1 | 11/2008 | Barrus et al. |
| 2008/0278633 | A1 | 11/2008 | Tsoupko-Sitnikov et al. |
| 2008/0279478 | A1 | 11/2008 | Tsoupko-Sitnikov et al. |
| 2008/0280247 | A1 | 11/2008 | Sachdeva et al. |
| 2008/0294393 | A1 | 11/2008 | Laake et al. |
| 2008/0297503 | A1 | 12/2008 | Dickinson et al. |
| 2008/0310757 | A1 | 12/2008 | Wolberg et al. |
| 2009/0010507 | A1 | 1/2009 | Geng |
| 2009/0040216 | A1 | 2/2009 | Ishiyama |
| 2009/0123037 | A1 | 5/2009 | Ishida |
| 2009/0129402 | A1 | 5/2009 | Moller et al. |
| 2009/0132371 | A1 | 5/2009 | Strietzel et al. |
| 2009/0135176 | A1 | 5/2009 | Snoddy et al. |
| 2009/0135177 | A1 | 5/2009 | Strietzel et al. |
| 2009/0144173 | A1 | 6/2009 | Mo et al. |
| 2009/0153552 | A1 | 6/2009 | Fidaleo et al. |
| 2009/0153553 | A1 | 6/2009 | Kim et al. |
| 2009/0153569 | A1 | 6/2009 | Park et al. |
| 2009/0154794 | A1 | 6/2009 | Kim et al. |
| 2009/0184960 | A1* | 7/2009 | Carr et al. .................. 345/422 |
| 2009/0185763 | A1 | 7/2009 | Park et al. |
| 2009/0219281 | A1 | 9/2009 | Maillot |
| 2009/0279784 | A1 | 11/2009 | Arcas et al. |
| 2009/0296984 | A1 | 12/2009 | Nijim et al. |
| 2009/0304270 | A1 | 12/2009 | Bhagavathy et al. |
| 2009/0310861 | A1 | 12/2009 | Lang et al. |
| 2009/0316945 | A1 | 12/2009 | Akansu |
| 2009/0316966 | A1 | 12/2009 | Marshall et al. |
| 2009/0324030 | A1 | 12/2009 | Frinking et al. |
| 2009/0324121 | A1 | 12/2009 | Bhagavathy et al. |
| 2010/0030578 | A1* | 2/2010 | Siddique et al. .................. 705/3 |
| 2010/0134487 | A1 | 6/2010 | Lai et al. |
| 2010/0138025 | A1 | 6/2010 | Morton et al. |
| 2010/0141893 | A1 | 6/2010 | Altheimer et al. |
| 2010/0145489 | A1 | 6/2010 | Esser et al. |
| 2010/0166978 | A1 | 7/2010 | Nieminen |
| 2010/0179789 | A1 | 7/2010 | Sachdeva et al. |
| 2010/0191504 | A1 | 7/2010 | Esser et al. |
| 2010/0198817 | A1 | 8/2010 | Esser et al. |
| 2010/0209005 | A1 | 8/2010 | Rudin et al. |
| 2010/0277476 | A1 | 11/2010 | Johanson et al. |
| 2010/0293192 | A1 | 11/2010 | Suy et al. |
| 2010/0293251 | A1 | 11/2010 | Suy et al. |
| 2010/0302275 | A1 | 12/2010 | Saldanha et al. |
| 2010/0329568 | A1 | 12/2010 | Gamliel et al. |
| 2011/0001791 | A1 | 1/2011 | Kirshenboim et al. |
| 2011/0025827 | A1 | 2/2011 | Shpunt et al. |
| 2011/0026606 | A1 | 2/2011 | Bhagavathy et al. |
| 2011/0026607 | A1 | 2/2011 | Bhagavathy et al. |
| 2011/0029561 | A1 | 2/2011 | Slaney et al. |
| 2011/0040539 | A1 | 2/2011 | Szymczyk et al. |
| 2011/0043540 | A1 | 2/2011 | Fancher et al. |
| 2011/0043610 | A1 | 2/2011 | Ren et al. |
| 2011/0071804 | A1 | 3/2011 | Xie |
| 2011/0075916 | A1 | 3/2011 | Knothe et al. |
| 2011/0096832 | A1 | 4/2011 | Zhang et al. |
| 2011/0102553 | A1 | 5/2011 | Corcoran et al. |
| 2011/0115786 | A1 | 5/2011 | Mochizuki |
| 2011/0148858 | A1 | 6/2011 | Ni et al. |
| 2011/0157229 | A1 | 6/2011 | Ni et al. |
| 2011/0158394 | A1 | 6/2011 | Strietzel |
| 2011/0166834 | A1 | 7/2011 | Clara |
| 2011/0188780 | A1 | 8/2011 | Wang et al. |
| 2011/0208493 | A1 | 8/2011 | Altheimer et al. |
| 2011/0211816 | A1 | 9/2011 | Goedeken et al. |
| 2011/0227923 | A1 | 9/2011 | Mariani et al. |
| 2011/0227934 | A1 | 9/2011 | Sharp |
| 2011/0229659 | A1 | 9/2011 | Reynolds |
| 2011/0229660 | A1 | 9/2011 | Reynolds |
| 2011/0234581 | A1 | 9/2011 | Eikelis et al. |
| 2011/0234591 | A1 | 9/2011 | Mishra et al. |
| 2011/0249136 | A1 | 10/2011 | Levy |
| 2011/0262717 | A1 | 10/2011 | Broen et al. |
| 2011/0267578 | A1 | 11/2011 | Wilson |
| 2011/0279634 | A1 | 11/2011 | Periyannan et al. |
| 2011/0292034 | A1 | 12/2011 | Corazza et al. |
| 2011/0293247 | A1 | 12/2011 | Bhagavathy et al. |
| 2011/0304912 | A1 | 12/2011 | Broen et al. |
| 2011/0306417 | A1 | 12/2011 | Sheblak et al. |
| 2012/0002161 | A1 | 1/2012 | Altheimer et al. |
| 2012/0008090 | A1 | 1/2012 | Atheimer et al. |
| 2012/0013608 | A1 | 1/2012 | Ahn et al. |
| 2012/0016645 | A1 | 1/2012 | Altheimer et al. |
| 2012/0021835 | A1 | 1/2012 | Keller et al. |
| 2012/0038665 | A1 | 2/2012 | Strietzel |
| 2012/0075296 | A1 | 3/2012 | Wegbreit et al. |
| 2012/0079377 | A1 | 3/2012 | Goosens |
| 2012/0082432 | A1 | 4/2012 | Ackley et al. |
| 2012/0114184 | A1 | 5/2012 | Barcons-Palau et al. |
| 2012/0114251 | A1 | 5/2012 | Solem et al. |
| 2012/0121174 | A1 | 5/2012 | Bhagavathy et al. |
| 2012/0130524 | A1 | 5/2012 | Clara et al. |
| 2012/0133640 | A1 | 5/2012 | Chin et al. |
| 2012/0133850 | A1 | 5/2012 | Broen et al. |
| 2012/0147324 | A1 | 6/2012 | Marin et al. |
| 2012/0158369 | A1 | 6/2012 | Bachrach et al. |
| 2012/0162218 | A1 | 6/2012 | Kim et al. |
| 2012/0166431 | A1 | 6/2012 | Brewington et al. |
| 2012/0170821 | A1 | 7/2012 | Zug et al. |

(56) References Cited

U.S. PATENT DOCUMENTS

| | | |
|---|---|---|
| 2012/0176380 A1 | 7/2012 | Wang et al. |
| 2012/0177283 A1 | 7/2012 | Wang et al. |
| 2012/0183202 A1 | 7/2012 | Wei et al. |
| 2012/0183204 A1 | 7/2012 | Aarts et al. |
| 2012/0183238 A1 | 7/2012 | Savvides et al. |
| 2012/0192401 A1 | 8/2012 | Pavlovskaia et al. |
| 2012/0206610 A1 | 8/2012 | Wang et al. |
| 2012/0219195 A1 | 8/2012 | Wu et al. |
| 2012/0224629 A1 | 9/2012 | Bhagavathy et al. |
| 2012/0229758 A1 | 9/2012 | Marin et al. |
| 2012/0256906 A1 | 10/2012 | Ross et al. |
| 2012/0263437 A1 | 10/2012 | Barcons-Palau et al. |
| 2012/0288015 A1 | 11/2012 | Zhang et al. |
| 2012/0294369 A1 | 11/2012 | Bhagavathy et al. |
| 2012/0294530 A1 | 11/2012 | Bhaskaranand |
| 2012/0299914 A1 | 11/2012 | Kilpatrick et al. |
| 2012/0306874 A1 | 12/2012 | Nguyen et al. |
| 2012/0307074 A1 | 12/2012 | Bhagavathy et al. |
| 2012/0314023 A1 | 12/2012 | Barcons-Palau et al. |
| 2012/0320153 A1 | 12/2012 | Barcons-Palau et al. |
| 2012/0321128 A1 | 12/2012 | Medioni et al. |
| 2012/0323581 A1 | 12/2012 | Strietzel et al. |
| 2013/0027657 A1 | 1/2013 | Esser et al. |
| 2013/0070973 A1 | 3/2013 | Saito et al. |
| 2013/0088490 A1 | 4/2013 | Rasmussen et al. |
| 2013/0187915 A1 | 7/2013 | Lee et al. |
| 2013/0201187 A1 | 8/2013 | Tong et al. |
| 2013/0271451 A1 | 10/2013 | Tong et al. |

FOREIGN PATENT DOCUMENTS

| | | |
|---|---|---|
| EP | 0359596 A1 | 3/1990 |
| EP | 0994336 A2 | 4/2000 |
| EP | 1011006 A1 | 6/2000 |
| EP | 1136869 A1 | 9/2001 |
| EP | 1138253 A2 | 10/2001 |
| EP | 0444902 B2 | 6/2002 |
| EP | 1450201 A1 | 8/2004 |
| EP | 1728467 A1 | 12/2006 |
| EP | 1154302 B1 | 8/2009 |
| FR | 2966038 A1 | 4/2012 |
| GB | 2449855 A | 12/2008 |
| JP | 2003345857 A | 12/2003 |
| JP | 2004272530 A | 9/2004 |
| JP | 2005269022 A | 9/2005 |
| KR | 20000028583 A | 5/2000 |
| KR | 200000051217 A | 8/2000 |
| KR | 20040097200 A | 11/2004 |
| KR | 20080086945 A | 9/2008 |
| KR | 20100050052 A | 5/2010 |
| WO | WO 9300641 A1 | 1/1993 |
| WO | WO 9604596 A1 | 2/1996 |
| WO | WO 9740342 A2 | 10/1997 |
| WO | WO 9740960 A1 | 11/1997 |
| WO | WO 9813721 A1 | 4/1998 |
| WO | WO 9827861 A1 | 7/1998 |
| WO | WO 9827902 A2 | 7/1998 |
| WO | WO 9835263 A1 | 8/1998 |
| WO | WO 9852189 A2 | 11/1998 |
| WO | WO 9857270 A1 | 12/1998 |
| WO | WO 9956942 A1 | 11/1999 |
| WO | WO 9964918 A1 | 12/1999 |
| WO | WO 0000863 A1 | 1/2000 |
| WO | WO 0016683 A1 | 3/2000 |
| WO | WO 0045348 A1 | 8/2000 |
| WO | WO 0049919 A1 | 8/2000 |
| WO | WO 0062148 A1 | 10/2000 |
| WO | WO 0064168 A1 | 10/2000 |
| WO | WO 0123908 A1 | 4/2001 |
| WO | WO 0132074 A1 | 5/2001 |
| WO | WO 0135338 A1 | 5/2001 |
| WO | WO 0161447 A1 | 8/2001 |
| WO | WO 0167325 A1 | 9/2001 |
| WO | WO 0174553 A2 | 10/2001 |
| WO | WO 0178630 A1 | 10/2001 |
| WO | WO 0188654 A2 | 11/2001 |
| WO | WO 0207845 A1 | 1/2002 |
| WO | WO 0241127 A2 | 5/2002 |
| WO | WO 03079097 A1 | 9/2003 |
| WO | WO 03084448 A1 | 10/2003 |
| WO | WO 2007012261 A1 | 2/2007 |
| WO | WO 2007017751 A1 | 2/2007 |
| WO | WO 2007018017 A1 | 2/2007 |
| WO | WO 2008009355 A1 | 1/2008 |
| WO | WO 2008009423 A1 | 1/2008 |
| WO | WO 2008135178 A1 | 11/2008 |
| WO | WO 2009023012 A1 | 2/2009 |
| WO | WO 2009043941 A1 | 4/2009 |
| WO | 2010039976 A1 | 4/2010 |
| WO | 2010042990 A1 | 4/2010 |
| WO | WO 2011012743 A2 | 2/2011 |
| WO | WO 2011095917 A1 | 8/2011 |
| WO | WO 2011134611 A1 | 11/2011 |
| WO | WO 2011147649 A1 | 12/2011 |
| WO | WO 2012051654 A1 | 4/2012 |
| WO | WO 2012054972 A1 | 5/2012 |
| WO | WO 2012054983 A1 | 5/2012 |

OTHER PUBLICATIONS

PCT International Search Report for PCT International Patent Application No. PCT/US2013/042504, mailed Aug. 19, 2013.

PCT International Search Report for PCT International Patent Application No. PCT/US2013/042509, mailed Sep. 2, 2013.

PCT International Search Report for PCT International Patent Application No. PCT/US2013/042514, mailed Aug. 30, 2013.

PCT International Search Report for PCT International Patent Application No. PCT/US2013/042517, mailed Aug. 29, 2013.

PCT International Search Report for PCT International Patent Application No. PCT/US2013/042512, mailed Sep. 6, 2013.

PCT International Search Report for PCT International Patent Application No. PCT/US2013/042529, mailed Sep. 17, 2013.

PCT International Search Report for PCT International Patent Application No. PCT/US2013/042525, mailed Sep. 17, 2013.

PCT International Search Report for PCT International Patent Application No. PCT/US2013/042520, mailed Sep. 27, 2013.

Tracker, Tracker Help, Nov. 2009.

3D Morphable Model Face Animation, http://www.youtube.com/watch?v=nice6NYb_WA, Apr. 20, 2006.

Visionix 3D iView, Human Body Measurement Newsletter, vol. 1., No. 2, Sep. 2005, pp. 2 and 3.

Blaise Aguera y Arcas demos Photosynth, May 2007. Ted.com, http://www.ted.com/talks/blaise_aguera_y_arcas_demos_photosynth.html.

ERC Tecnology Leads to Eyeglass "Virtual Try-on" System, Apr. 20, 2012, http://showcase.erc-assoc.org/accomplishments/microelectronic/imsc6-eyeglass.htm.

U.S. Appl. No. 13/775,785, filed Feb. 25, 2013, Systems and Methods for Adjusting a Virtual Try-On.

U.S. Appl. No. 13/775,764, filed Feb. 25, 2013, Systems and Methods for Feature Tracking.

U.S. Appl. No. 13/774,995, filed Feb. 22, 2013, Systems and Methods for Scaling a Three-Dimensional Model.

U.S. Appl. No. 13/774,985, filed Feb. 22, 2013, Systems and Methods for Generating a 3-D Model of a Virtual Try-On Product.

U.S. Appl. No. 13/774,983, filed Feb. 22, 2013, Systems and Methods for Generating a 3-D Model of a User for a Virtual Try-On Product.

U.S. Appl. No. 13/774,978, filed Feb. 22, 2013, Systems and Methods for Efficiently Processing Virtual 3-D Data.

U.S. Appl. No. 13/774,958, filed Feb. 22, 2013, Systems and Methods for Rendering Virtual Try-On Products.

U.S. Appl. No. 13/706,909, filed Dec. 6, 2012, Systems and Methods for Obtaining a Pupillary Distance Measurement Using a Mobile Computing Device.

Sinha et al., GPU-based Video Feautre Tracking and Matching, http::frahm.web.unc.edu/files/2014/01/GPU-based-Video-Feature—Tracking-And Matching.pdf, May 2006.

Dror et al., Recognition of Surface Relfectance Properties form a Single Image under Unknown Real-World Illumination, IEEE, Pro-

(56) References Cited

OTHER PUBLICATIONS ceedings of the IEEE Workshop on Identifying Objects Across Variations in Lighting: Psychophysics & Computation, Dec. 2011.
Simonite, 3-D Models Created by a Cell Phone, Mar. 23, 2011, url: http://www.technologyreview.com/news/42338613-d-models-created-by-a-cell-phone/.
Fidaleo, Model-Assisted 3D Face Reconstruction from Video, AMFG'07 Analysis and Modeling of Faces and Gestures Lecture Notes in Computer Science vol. 4778, 2007, pp. 124-138.
Garcia-Mateos, Estimating 3D facial pose in video with just three points, CVPRW '08 Computer vision and Pattern Recognition Workshops, 2008.

* cited by examiner

SYSTEMS AND METHODS FOR RENDERING VIRTUAL TRY-ON PRODUCTS

RELATED APPLICATIONS

This application claims priority to U.S. Provisional Application No. 61/650,983, entitled SYSTEMS AND METHODS TO VIRTUALLY TRY-ON PRODUCTS, filed on May 23, 2012; and U.S. Provisional Application No. 61/735,951, entitled SYSTEMS AND METHODS TO VIRTUALLY TRY-ON PRODUCTS, filed on Dec. 11, 2012, which is incorporated herein in its entirety by this reference.

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. For example, computers have opened up an entire industry of internet shopping. In many ways, online shopping has changed the way consumers purchase products. However, in some cases, consumers may avoid shopping online. For example, it may be difficult for a consumer to know if they will look good in and/or with a product without seeing themselves in and/or with the product. In many cases, this challenge may deter a consumer from purchasing a product online. Therefore, rendering three-dimensional (3-D) scenes to improve the online shopping experience may be desirable.

SUMMARY

According to at least one embodiment, a computer-implemented method for virtual rendering virtual try-on products is described. A first render viewpoint of a virtual three-dimensional (3-D) space may be selected that includes a 3-D model of at least a portion of a user generated from an image of the user and a 3-D polygon mesh of an object. Polygons of the 3-D polygon mesh may be designated as backwards-facing polygons and front-facing polygons in relation to the first render viewpoint. A shadow texture map of the object may be applied to the 3-D model of the user. A transparency texture map of the object may be applied to a backwards-facing polygon of the 3-D polygon mesh of the object. A first color texture map of the object may be applied to the result of the application of the transparency texture map to the backwards-facing polygon. The virtual 3-D space may be rendered at the first render viewpoint. The transparency texture map of the object may be applied to a front-facing polygon of the 3-D polygon mesh of the object. The first color texture map of the object may be applied to the result of the application of the transparency texture map to the front-facing polygon. The virtual 3-D space may be rendered at the first render viewpoint In some embodiments, at least a portion of the 3-D polygon mesh of the object may be placed within a predetermined distance of at least one point on the 3-D model of the user.

In some embodiments, a shadow value of the object may be detected from a scan of the object. In some cases, a shadow texture map may be created from the detected shadow value. A 2-D coordinate of the shadow texture map may be mapped to a point on the 3-D model of the user and a value of the point on the 3-D model of the user may be multiplied by the shadow value.

In some embodiments, a transparency value of the object may be detected from a scan of the object. In some cases, a transparency texture map may be created from the detected transparency value. A 2-D coordinate of the transparency texture map may be mapped to a point on the 3-D model of the user and the 3-D polygon mesh of the object. A value of the point on the 3-D model of the user and the 3-D polygon mesh of the object may be multiplied by the transparency value.

In some embodiments, a first scanning angle of a scan of an object may be selected. The first scanning angle may correspond to the first render viewpoint. In some cases, a first color value of the object may be detected at the first scanning angle. A first color texture map may be created from the detected color value. A 2-D coordinate of the first color texture map may be mapped to a point on the 3-D model of the user and the 3-D polygon mesh of the object. The resultant value of multiplying the point on the 3-D model of the user and the 3-D polygon mesh of the object by the transparency value may be multiplied by the first color value.

In some embodiments, a second render viewpoint of the virtual 3-D space may be selected. In some cases, a second scanning angle of a scan of an object may be selected. The second scanning angle may correspond to the second render viewpoint. A second color value of the object at the second scanning angle may be detected. A second color texture map from the detected second color value may be created. In some cases, the shadow texture map of the object may be applied to the 3-D model of the user at the second render viewpoint. The transparency texture map of the object may be applied to the backwards-facing polygon of the 3-D polygon mesh of the object at the second render viewpoint. The second color texture map of the object may be applied to the result of the application of the transparency texture map to the backwards-facing polygon at the second render viewpoint. The transparency texture map of the object may be applied to the front-facing polygon of the 3-D polygon mesh of the object at the second render viewpoint. The second col- or texture map of the object may be applied to the result of the application of the transparency texture map to the front-facing polygon at the second render viewpoint. The virtual 3-D space may be rendered at the second render viewpoint.

In some embodiments, the 3-D polygon mesh of the object may be divided into two or more portions. An order to the portions of the divided 3-D polygon mesh of the object may be determined from furthest portion to closest portion relative to the determined render viewpoint of the virtual 3-D space.

In some cases, the present system may determine whether a portion of the 3-D polygon mesh of the object is visible in relation to the 3-D model of the user based on the determined render viewpoint. The 3-D polygon mesh of the object may be rendered from the furthest portion to the closest portion based on a visible portion of the 3-D polygon mesh of the object.

A computing device configured to scale a three-dimensional (3-D) model is also described. The device may include a processor and memory in electronic communication with the processor. The memory may store instructions that are executable by the processor to select a first render viewpoint of a virtual 3-D space. The virtual 3-D space may include a 3-D model of at least a portion of a user generated from an image of the user and a 3-D polygon mesh of an object. Additionally, the instructions may be executable by the processor to designate a first polygon of the 3-D polygon mesh of the object as a backwards-facing polygon in relation to the first render viewpoint, designate a second polygon of the 3-D polygon mesh of the object as a front-facing polygon in relation to the first render viewpoint, and apply a shadow texture map of the object to the 3-D model of the user. Additionally, the instructions may be executable by the process to apply a transparency texture map of the object to the backwards-facing polygon of the 3-D polygon mesh of the object, apply a first color texture map of the object to the result of the application of the transparency texture map to the backwards-facing polygon, and render the virtual 3-D space at the first render viewpoint.

A computer-program product to scale a three-dimensional (3-D) model is also described. The computer-program product may include a non-transitory computer-readable medium that stores instructions. The instructions may be executable by a processor to select a first render viewpoint of a virtual 3-D space. The virtual 3-D space comprises a 3-D model of at least a portion of a user generated from an image of the user and a 3-D polygon mesh of an object. Additionally, the instructions may be executable by the processor to designate a first polygon of the 3-D polygon mesh of the object as a backwards-facing polygon in relation to the first render viewpoint, designate a second polygon of the 3-D polygon mesh of the object as a front-facing polygon in relation to the first render viewpoint, and apply a shadow texture map of the object to the 3-D model of the user. Additionally, the instructions may be executable by a processor to apply a transparency texture map of the object to the backwards-facing polygon of the 3-D polygon mesh of the object, apply a first color texture map of the object to the result of the application of the transparency texture map to the backwards-facing polygon, and apply the transparency texture map of the object to the front-facing polygon of the 3-D polygon mesh of the object. Additionally, the instructions may be executable by the processor to apply the first color texture map of the object to the result of the application of the transparency texture map to the front-facing polygon and render the virtual 3-D space at the first render viewpoint.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
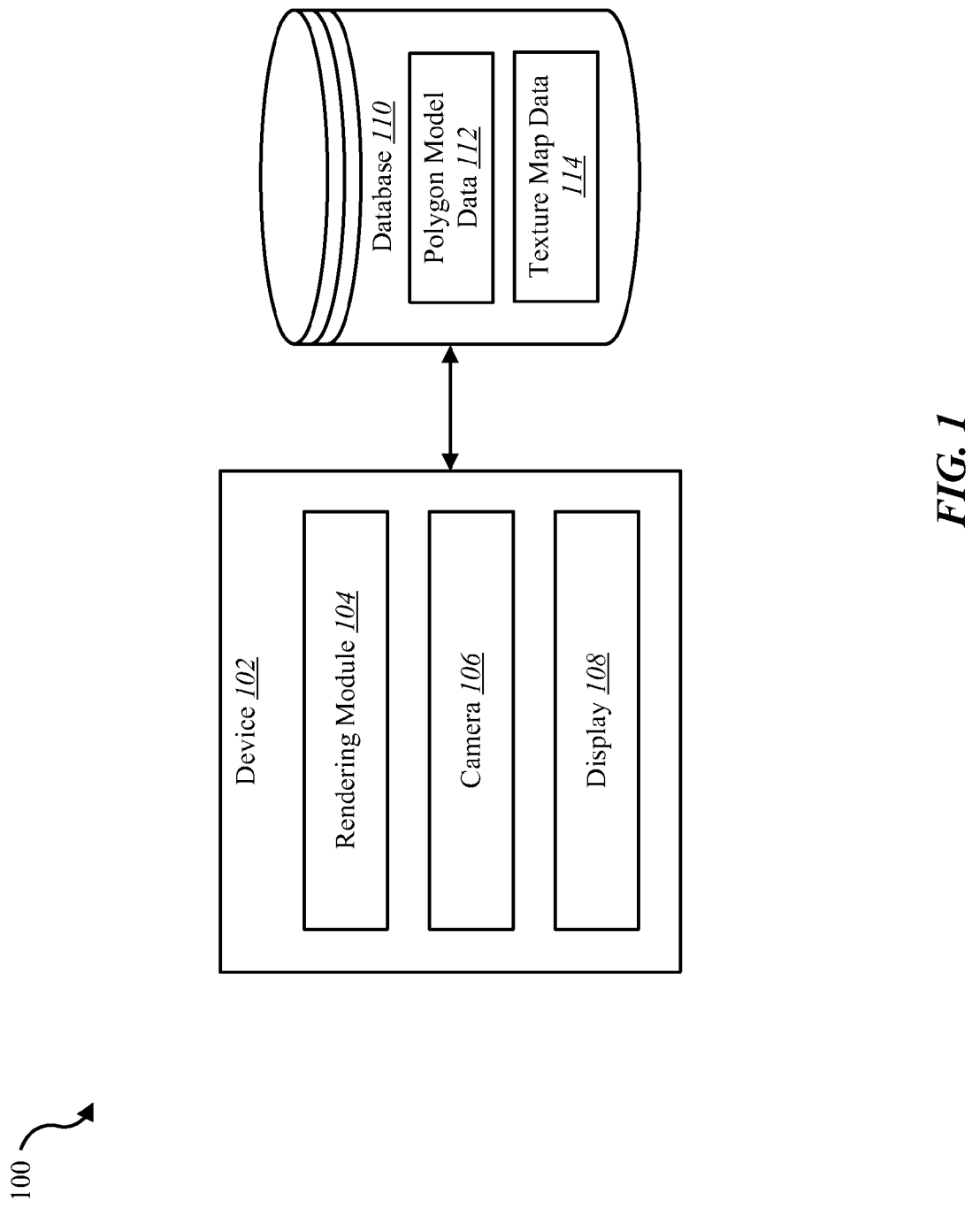
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to the virtually tying-on of products. Three-dimensional (3-D) computer graphics are graphics that use a 3-D representation of geometric data that is stored in the computer for the purposes of performing calculations and rendering 2-D images. Such images may be stored for viewing later or displayed in real-time. A 3-D space may include a mathematical representation of a 3-D surface of an object. A 3-D model may be contained within a graphical data file. A 3-D model may represent a 3-D object using a collection of points in 3-D space, connected by various geometric entities such as triangles, lines, curved surfaces, etc. Being a collection of data (points and other information), 3-D models may be created by hand, algorithmically (procedural modeling), or scanned such as with a laser scanner. A 3-D model may be displayed visually as a two-dimensional image through a process called 3-D rendering, or used in non-graphical computer simulations and calculations. In some cases, the 3-D model may be physically created using a 3-D printing device.

A virtual 3-D space may include a 3-D model of a user's face and a polygon mesh of a pair of glasses. The 3-D polygon mesh of the pair of glasses may be placed on the user to create a 3-D virtual depiction of the user wearing a properly scaled pair of glasses. This 3-D scene may then be rendered into a two-dimensional (2-D) image to provide the user a virtual depiction of the user wearing a certain style of glasses. Although many of the examples used herein describe the virtual try-on of glasses, it is understood that the systems and methods described herein may be used to virtually try-on a wide variety of products. Examples of such products may include glasses, clothing, footwear, jewelry, accessories, hair styles, etc.

FIG. 1 is a block diagram illustrating one embodiment of an environment 100 in which the present systems and methods may be implemented. In some embodiments, the systems and methods described herein may be performed on a single device (e.g., device 102). For example, a rendering module 104 may be located on the device 102. Examples of devices 102 include mobile devices, smart phones, personal computing devices, computers, servers, etc.

In some configurations, a device 102 may include a rendering module 104, a camera 106, and a display 108. In one example, the device 102 may be coupled to a database 110. In one embodiment, the database 110 may be internal to the device 102. In another embodiment, the database 110 may be external to the device 102. In some configurations, the database 110 may include polygon model data 112 and texture map data 114.

In one embodiment, the rendering module 104 may enable a user to virtually try-on a pair of glasses. In some configurations, the rendering module 104 may obtain multiple images of a user. For example, the rendering module 104 may capture multiple images of a user via the camera 106. For instance, the rendering module 104 may capture a video (e.g., a 5 second video) via the camera 106. In some configurations, the rendering module 104 may use polygon model data 112 and texture map data 114 to generate a 3-D representation of a user. For example, the polygon model data 112 may include vertex coordinates of a polygon model of the user's head. In some embodiments, the rendering module 104 may use color information from the pixels of multiple images of the user to create a texture map of the user. In some configurations, the rendering module 104 may generate and/or obtain a 3-D representation of a product. For example, the polygon model data 112 and texture map data 114 may include a 3-D model of a pair of glasses. In some embodiments, the polygon model data 112 may include a polygon model of an object. In some configurations, the texture map data 114 may define a visual aspect (e.g., pixel information) of the 3-D model of the object such as color, texture, shadow, or transparency.

In some configurations, the rendering module 104 may generate a virtual try-on image by rendering a virtual 3-D space that contains a 3-D model of a user and a 3-D model of a product. In one example, the virtual try-on image may illustrate the user with a rendered version of the product. In some configurations, the rendering module 104 may output the virtual try-on image to the display 108 to be displayed to the user.

Figure 2:
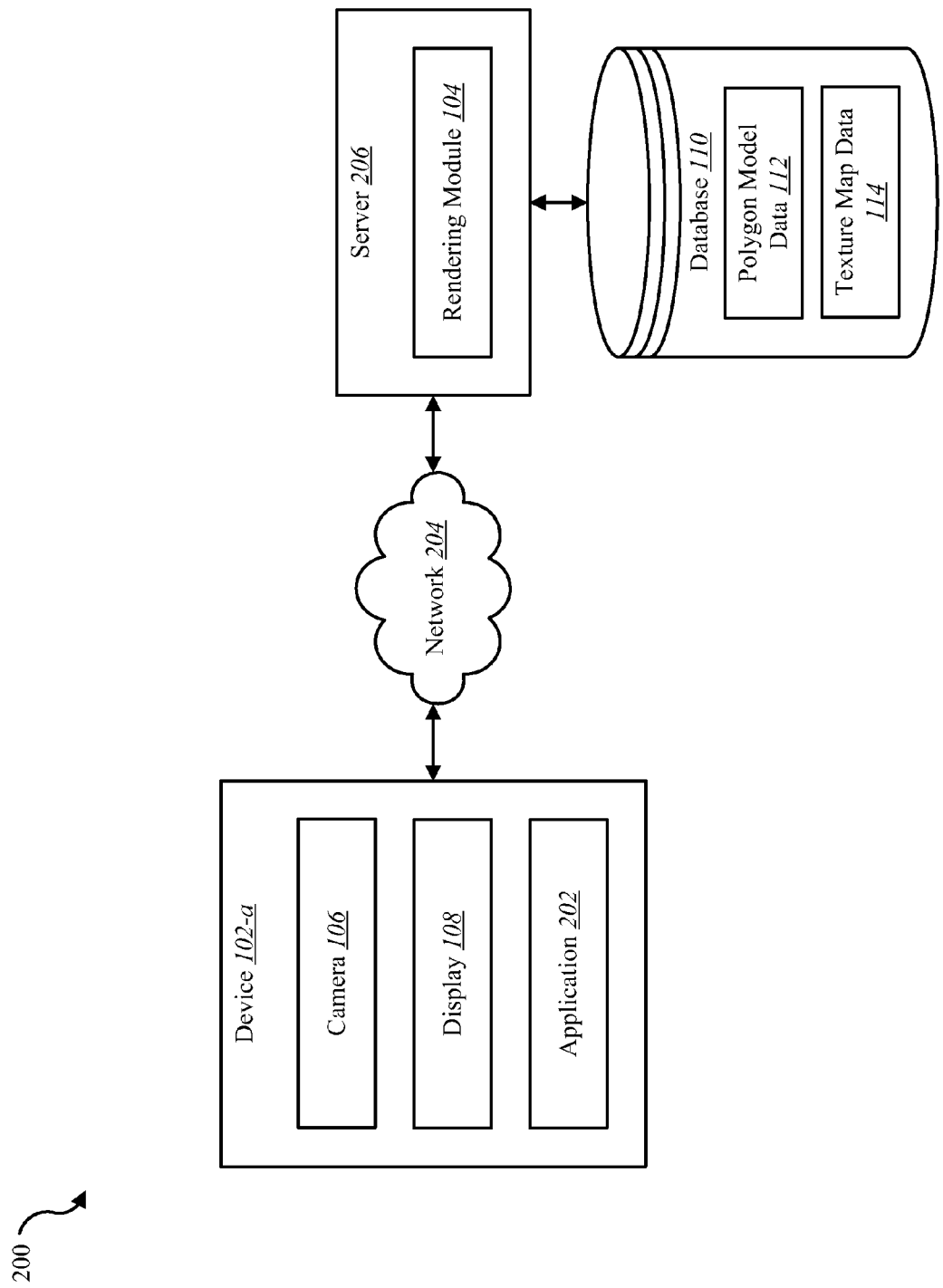
FIG. 2 is a block diagram illustrating another embodiment of an environment in which the present systems and methods may be implemented.

FIG. 2 is a block diagram illustrating another embodiment of an environment 200 in which the present systems and methods may be implemented. In some embodiments, a device 102-a may communicate with a server 206 via a network 204. Example of networks 204 include, local area networks (LAN), wide area networks (WAN), virtual private networks (VPN), wireless networks (using 802.11, for example), cellular networks (using 3G and/or LTE, for example), etc. In some configurations, the network 204 may include the internet. In some configurations, the device 102-a may be one example of the device 102 illustrated in FIG. 1. For example, the device 102-a may include the camera 106, the display 108, and an application 202. It is noted that in some embodiments, the device 102-a may not include a rendering module 104. In some embodiments, both a device 102-a and a server 206 may include a rendering module 104 where at least a portion of the functions of the rendering module 104 are performed separately and/or concurrently on both the device 102-a and the server 206.

In some embodiments, the server 206 may include the rendering module 104 and may be coupled to the database 110. For example, the rendering module 104 may access the polygon model data 112 and the texture map data 114 in the database 110 via the server 206. The database 110 may be internal or external to the server 206.

In some configurations, the application 202 may capture multiple images via the camera 106. For example, the application 202 may use the camera 106 to capture a video. Upon capturing the multiple images, the application 202 may process the multiple images to generate result data. In some embodiments, the application 202 may transmit the multiple images to the server 206. Additionally or alternatively, the application 202 may transmit to the server 206 the result data or at least one file associated with the result data.

In some configurations, the rendering module 104 may process multiple images of a user to generate a 3-D model of the user. In some configurations, the rendering module 104 may process a scan of an object to create a 3-D polygon model of the object. The rendering module 104 may render a 3-D space that includes the 3-D model of the user and the 3-D polygon model of the object to render a virtual try-on 2-D image of the object and the user. The application 202 may output the rendered virtual try-on image to the display 208 to be displayed to the user.

Figure 3:
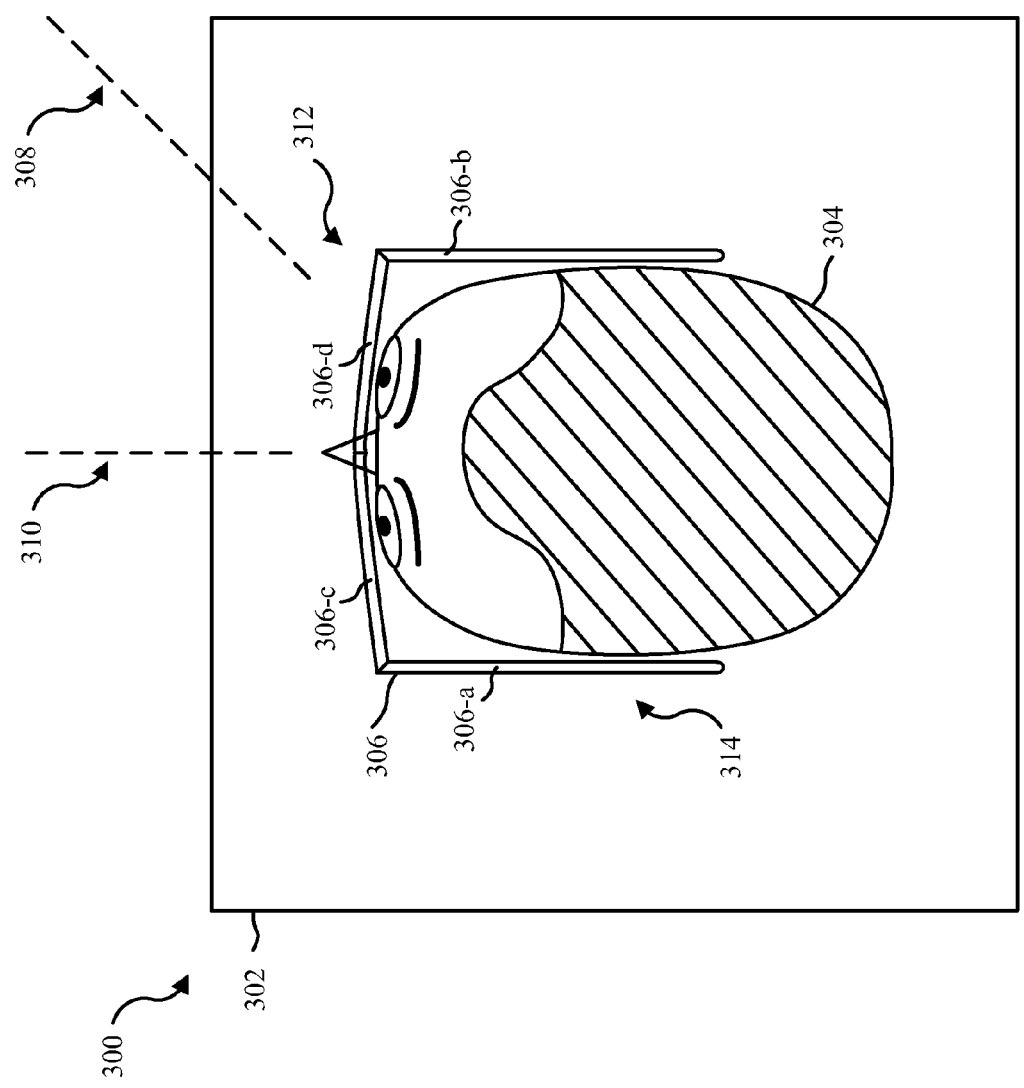
FIG. 3 illustrates an example arrangement of a virtual 3-D space.

FIG. 3 illustrates an example arrangement 300 of a virtual 3-D space 302. As depicted, the 3-D space 302 of the example arrangement 300 may include a 3-D model of a user's head 304 and a 3-D model of a pair of glasses 306. The example arrangement 300 may also include a first render viewpoint 308 and a second render viewpoint 310. In some embodiments, the first and second render viewpoints 308 and 310 may correspond to first and second scanning angles (not shown). In some embodiments, the first and second scanning angle may be associated with scanning of a user's head to create the 3-D model of the user's head 304. Additionally or alternatively, the first and second scanning angle may be associated with scanning of a pair of glasses to create the 3-D model of the glasses 306.

In some embodiments, the 3-D model of the user's head 304 may include a polygon model of the user's head, which may be stored in the database 110 as polygon data 112, and at least one texture map, which may be stored in the database 110 as texture map data 114. In some embodiments, the 3-D model of the glasses 306 may include a polygon model of the glasses, which may be stored in the database 110 as polygon data 112, and at least one texture map, which may be stored in the database 110 as texture map data 114. In some embodiments, the polygon model of the glasses may include front-facing polygons 312 and backwards-facing polygons 314. For example, those polygons that face the first rendering viewing angle 308 may be designated as front-facing polygons 312 and those polygons that do not face the first rendering viewing angle 308 may be designated as backwards-facing polygons 314.

In some embodiments, the 3-D model of the glasses 306 may be divided into multiple parts. As depicted in FIG. 3, the 3-D model of the glasses 306 may be divided into a left arm 306-a, a right arm 306-b, a left lens and frame 306-c, and a right lens and frame 306-d. In some embodiments, the 3-D space 302 may be rendered based on the position of the parts 306-a, 306-b, 306-c, and 306-d of the 3-D model of the glasses 306 in the 3-D space 302 relative to a render viewpoint. For example, the rendering module 104 may render the 3-D space 302 in order of furthest to closest parts of the 3-D model of the glasses 306 in relation to the first render viewpoint 308. In other words, the rendering module 104 may render first the left arm 306-a (i.e., the farthest part relative to the first render viewpoint 308), the left lens and frame 306-c next, then the right lens and frame 306-d, and finally the right arm 306-b (i.e., the closest part relative to the first render viewpoint 308).

In some embodiments, the rendering module 104 may determine whether a portion of the 3-D model of the glasses 306 is visible in relation to a render of the 3-D space 302 at a particular render viewpoint. For example, as depicted in FIG. 3, the rendering module 104 may determine that only a portion of the left arm 306-a is visible in relation to the first render viewpoint 308. Thus, the rendering module 104 may render only that portion of the left arm 306-a that is visible in a render of the 3-D space 302 at the first render viewpoint 308. Rendering of the 3-D space 302 is discussed in further detail below in relation to the description of FIGS. 4, 5, and 6.

Figure 4:
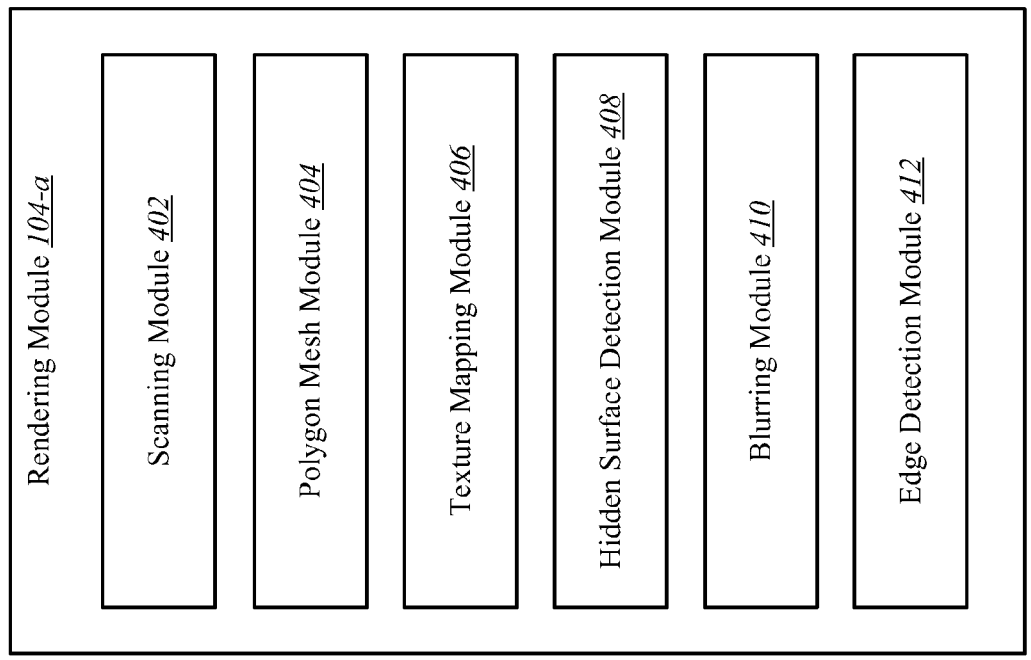
FIG. 4 is a block diagram illustrating one example of a rendering module.

FIG. 4 is a block diagram illustrating one example of a rendering module 104-a. The rendering module 104-a may be one example of the rendering module 104 illustrated in FIG. 1 or 2.

In some embodiments, the rendering module 104-a may include a scanning module 402, a polygon mesh module 404, a texture mapping module 406, a hidden surface detection module 408, a blurring module 410, and an edge detection module 412. In one embodiment, the rendering module 104-a may be configured to select a first render viewpoint of a virtual 3-D space. A render viewpoint may be the point of view of a virtual 3-D space, and may be referred to as the view reference point (VRP). In other words, the render viewpoint may be the view a user would see were a user to gaze at a depiction of the 3-D space or 3-D scene from a certain point of view. Thus, theoretically an infinite number of render viewpoints are possible that involve the orientation of the 3-D space relative to the position of a point of view of the 3-D space. The virtual 3-D space may include a 3-D model of at least a portion of a user generated from an image of the user. For example, the virtual 3-D space may include a 3-D model of a user's head that is generated from one or more images of the user's head. The virtual 3-D space may also include a 3-D polygon mesh of an object. For instance, the virtual 3-D space may include a 3-D polygon mesh of a pair of glasses. The 3-D polygon mesh may include a collection of vertices, edges and surfaces that define the shape of a polyhedral object in 3-D computer graphics and modeling. The surface of the 3-D polygon mesh may include triangles, quadrilaterals, or other convex polygons. In some configurations, the rendering module 104-a may be configured to render the virtual 3-D space at a selected render viewpoint such as the first render viewpoint. In some embodiments, the rendering module 104-a may be configured to place or position at least a portion of the 3-D polygon mesh of the object within a predetermined distance of at least one point on the 3-D model of the user. For instance, the 3-D polygon mesh of the object may include a 3-D polygon mesh of a pair of glasses. The 3-D polygon mesh of the glasses may be placed within a predetermined distance of a 3-D model of the user's head. For example, a 3-D polygon mesh of a pair of glasses may be placed within a predetermined distance of a 3-D model of a user's head so as to make the 3-D polygon mesh of the glasses appear to be worn on the head of a 3-D model of the user.

In some embodiments, the rendering module 104-a may be configured to select a second render viewpoint of the virtual 3-D space. For example, the rendering module 104-a may select a first render viewpoint that depicts a side-view, or profile of a 3-D model of a user's head wearing a 3-D model of a pair of glasses. The rendering module 104-a may select a second render viewpoint that depicts a frontal, head-on view of the 3-D model of the user's head wearing a 3-D model of the pair of glasses. In some configurations, the rendering module 104-a may be configured to render the virtual 3-D space at the first and second render viewpoints. Thus, the rendering module 104-a may render a side-view of the 3-D model of the user wearing the 3-D model of the pair of glasses (i.e., the first render viewpoint), and may render a head-on view where the 3-D depiction of the user's face is directly facing in the direction of the rendering of the 3-D space.

In some embodiments, the scanning module 402 may be configured to detect a shadow value of an object from a scan of the object. A shadow value of an object may include information about a shadow cast by the object captured from the scan of the object. For example, a pair of glasses may be scanned by a laser. From this laser scan the scanning module 402 may detect one or more values associated with a shadow cast by the object. For example, the scanning module 402 may detect a level of shadow cast by certain parts of a pair of glasses. The scanning module 402 may determine that the degree of shadow cast by an opaque segment of the pair of glasses is greater than the degree of shadow cast by the lens. Furthermore, the scanning module 402 may determine that directly behind the center of an arm of the glasses running the length of the arm may cast a higher degree of shadow than the edges of the arm where a shadow may gradually dissipate.

In some configurations, the scanning module 402 may be configured to detect a transparency value of an object from a scan of the object. A transparency value of an object may include information about the transparent nature of a portion of the object captured from the scan of the object. For example, the scanning module 402 may determine that a lens in a pair of glasses has a transparency value of 50%, meaning that 50% of the light that hits the surface of the lens is transferred through the lens and the other 50% of the light is reflected off the surface of the lens. The scanning module 402 may detect the 50% transparency as one transparency value associated with the scan of the glasses. Additionally, the scanning module 402 may determine that a portion of the frame of the pair of glasses has a transparency value of 0%, meaning that 100% of the light that hits the surface of the frame is reflected. The scanning module 402 may detect the 0% transparency as another transparency value associated with the scan of the glasses.

In one embodiment, the scanning module 402 may be configured to select a first scanning angle of a scan of an object. The first scanning angle may correspond to the first render viewpoint. Thus, scanning a pair of glasses at 30 degrees left of center of a pair of glasses may correspond to an image of a user taken at 30 degrees left of a center or head-on view of the user. In some embodiments, the scanning module 402 may be configured to detect a first color value from a scan of an object at the first scanning angle. A color value of an object may include information about a visual aspect of the object captured from the scan of the object. For example, the scanning module 402 may scan a pair glasses with shiny red frames. Thus, the scanning module 402 may detect the red color of the frames as one color value associated with the scan of the glasses. Additionally or alternatively, the scanning module 402 may detect other visual aspects associated with the scanned frames such as the reflectivity of the frames and save the reflectivity as a value associated with the surface of the frames. In some configurations, the scanning module 402 may be configured to select a second scanning angle of a scan of an object. The second scanning angle may correspond to the second render viewpoint. The scanning module 402 may be configured to detect a second color value of an object at the second scanning angle. Thus, scanning a pair of glasses at 40 degrees left of the center or head-on view of a pair of glasses may correspond to a second image of a user taken at 40 degrees left of the center or head-on view of the user. Similar to the scan at the first angle, the scanning module 402 may detect visual aspects associated with the frames scanned at the second scanning angle such as the color and reflectivity of the frames and save the color and reflectivity as values associated with the surface of the frames In some embodiments, the hidden surface detection module 408 may be configured to determine whether a portion of the 3-D polygon mesh of the object is visible in relation to the 3-D model of the user based on the determined render viewpoint. The rendering of the 3-D space may include rendering the scene of the virtual 3-D space based on a visible portion of the 3-D polygon mesh of the object. In other words, rendering the 3-D space when the render viewpoint depicts the left side of the 3-D model of the user's head, portions of the 3-D polygon mesh of the object that are positioned to the right side of the 3-D model of the user's head would not be visible in the render. In other words, in some embodiments, the texture mapping module 406 does not apply one or more elements of the texture maps (i.e., shadow texture map, transparency texture map, and/or color texture map) to those portions of the 3-D polygon mesh of the object that would not be visible in the render due to the positioning of the 3-D model of the user relative to the selected render viewpoint. Thus, in some embodiments, the rendering module 402-*a* renders those portions of the 3-D polygon mesh of the object that are visible based on the determined render viewpoint.

In some embodiments, the polygon mesh module 404 may be configured to designate at least one polygon of the 3-D polygon mesh of the object as a backwards-facing polygon in relation to a render viewpoint. In some configurations, the polygon mesh module 404 may be configured to designate at least one polygon of the 3-D polygon mesh of the object as a front-facing polygon in relation to a render viewpoint. As explained above, the 3-D polygon mesh of the object may include a collection of vertices, edges and surfaces that define the shape of a polyhedral version of the object in a virtual 3-D space. Thus, the surface of a 3-D polygon mesh of a pair of glasses may include triangles, quadrilaterals, or other convex polygons. As with all 3-D objects, the surface of the 3-D polygon mesh of the pair of glasses may include polygons on six different surfaces. For example, the left arm of a pair of glasses may include top and bottom surfaces, left and right surfaces, and front and back surfaces in relation to a given render viewpoint. With a render viewpoint positioned to view the left side of a 3-D model of a user's head, the polygons of the outside surface of the left arm of a 3-D model of a pair of glasses worn on the 3-D model of the user's head would face the render viewpoint. The inside surface, the polygons facing the left side of the 3-D model of the user's face, would face away from the render viewpoint. Thus, with a render viewpoint positioned to view the left side of a 3-D model of a user's head, the polygon mesh module 404 may designate the polygons of the outside surface of the left arm of a 3-D model of a pair of glasses worn on the 3-D model of the user's head as front-facing polygons. Similarly, the polygon mesh module 404 may designates the inside polygons facing the left side of the 3-D model of the user's face as backwards-facing polygons. As explained above with reference to FIG. 3, in one embodiment, the polygon mesh module 404 may be configured to divide 3-D polygon mesh of an object into two or more portions. For example, the polygon mesh module 404 may be configured to divide a 3-D polygon mesh of a pair of glasses into two or more parts. For instance, the polygon mesh module 404 may divide the 3-D polygon mesh of the pair of glasses into a first part that includes the left arm, a second part that includes the right arm, a third part that includes the left lens and frame, and a fourth part that includes the right lens and frame.

In some embodiments, the rendering module 104-*a* may be configured to determine an order to multiple portions of a divided 3-D polygon mesh of an object from the farthest portion to the closest portion relative to a determined render viewpoint of the virtual 3-D space. For example, with a render viewpoint of a left profile of a 3-D model of a user's head wearing a 3-D model of a pair of glasses, the render module 104-*a* may determine the polygon mesh of the left arm of the pair of glasses to be the closest portion of the 3-D polygon mesh of the glasses, followed by the left lens and frame and the right lens and frame. Thus, the render module 104-*a* may determine that the polygon mesh of the right arm of the pair of glasses to be the farthest portion of the 3-D polygon mesh of the glasses. Upon determining the order of the parts of the 3-D polygon mesh of an object, in some embodiments, the rendering module 104-*a* may be configured to render the 3-D polygon mesh of the object from the furthest portion to the closest portion.

Figure 5:
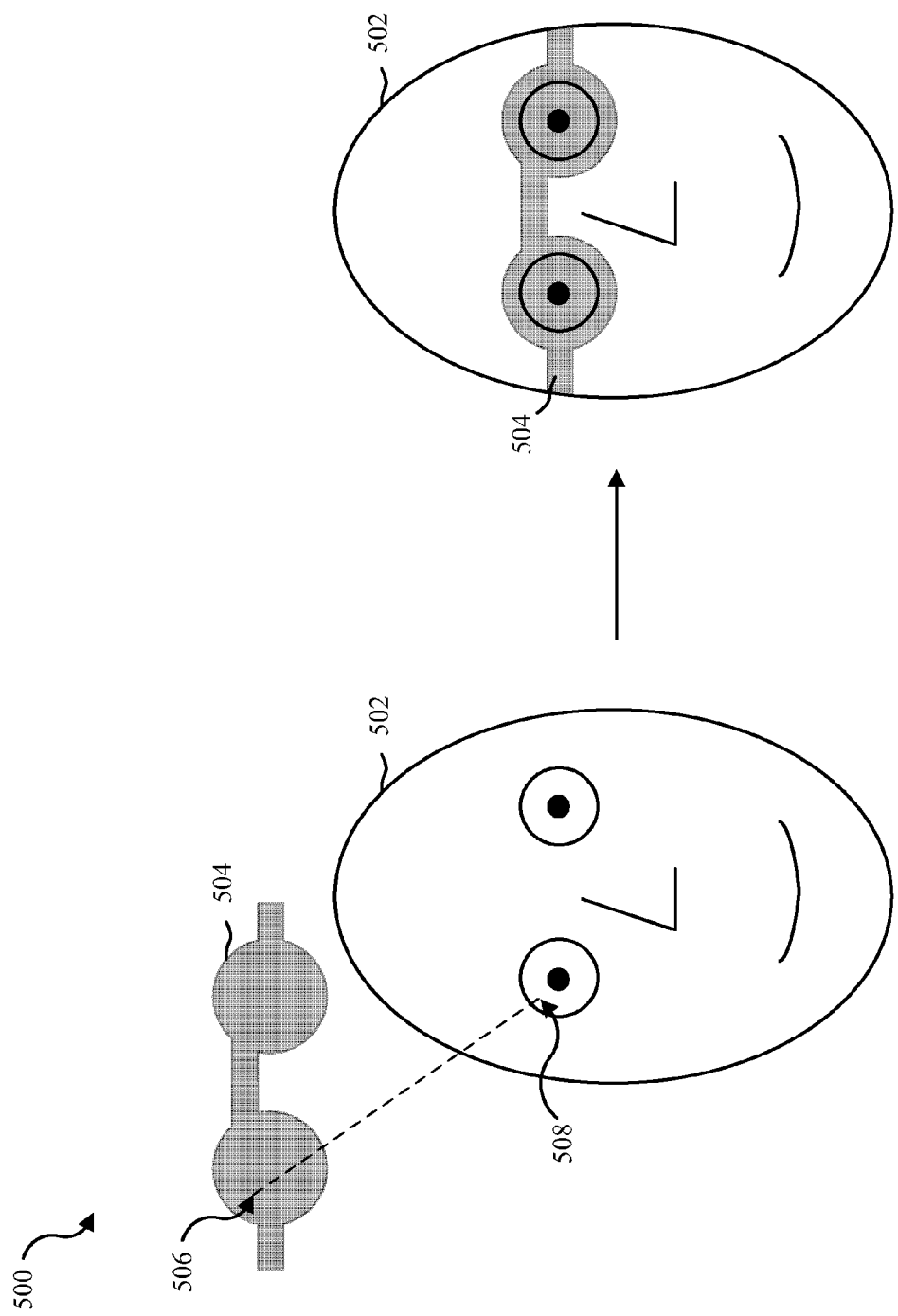
FIG. 5 illustrates another example arrangement of a virtual 3-D space.

FIG. 5 illustrates another example arrangement of a virtual 3-D space 500. In particular, the illustrated 3-D space 500 includes a 3-D model of a user 502 and a depiction of a shadow texture map 504. In some embodiments, the texture mapping module 406 may be configured to create the shadow texture map 504 from a shadow value. As depicted in FIG. 5, in some embodiments, the texture mapping module 406 may be configured to map a 2-D coordinate 506 of the shadow texture map 504 to a point 508 on the 3-D model of the user 502. For example, the texture mapping module 406 may convert a shadow value detected from a scan of an object by the scanning module 402 into a 2-D image and store the shadow texture map 2-D image as texture map data in the database 110. The point 508 on the 3-D model of the user 502 may include information associated with a visual aspect of the 3-D model of the user 502 such as color information. Thus, the texture mapping module 406 may be configured to multiply a value of the point 508 on the 3-D model of the user by the shadow value at the 2-D coordinate 506 of the shadow texture map 504 resulting in the point 508 on the 3-D model including the original information associated with the point 508 and a value associated with the shadow texture map 504 such as the lightness or darkness of the shadow at that point 506 on the shadow texture map 504.

Referring again to FIG. 4, in some embodiments, the texture mapping module 406 may be configured to create a transparency texture map from a detected transparency value. For example, the texture mapping module 406 may convert a transparency value detected from a scan of an object by the scanning module 402 into a transparency texture map 2-D image and store the 2-D image as texture map data 114 in the database 110. As explained above, the transparency texture map may include information regarding the transparent aspects associated with the scanned object such as a fully- or semi-transparent lens, a semi-transparent portion of a frame, and/or an opaque portion of a frame or lens. As with the shadow texture map, the texture mapping module 406 may convert a transparency value detected from a scan of an object by the scanning module 402 into a 2-D image and save this 2-D image as the transparency texture map. In some configurations, the texture mapping module 406 may be configured to map a 2-D coordinate of the transparency texture map to a point on the 3-D model of the user and a 3-D polygon mesh of the object. In order the create the look of transparency, the texture mapping module 406 may map a point of the 3-D model of the user that is visible through a transparent portion of the 3-D model of the object to a point on the 3-D polygon mesh of the object. In other words, data associated with the visual aspects of a portion of the 3-D model of the user visible behind the lens on a 3-D polygon of a pair of glasses may be merged with transparency data associated the lens to render the effect of seeing the portion of the user through the lens. In some embodiments, the texture mapping module 406 may be configured to multiply the value of the point on the 3-D model of the user by the transparency value.

In some embodiments, the texture mapping module 406 may be configured to create a first color texture map from a detected first color value from a scan of the object at a first scanning angle. In some embodiments, the texture mapping module 406 may be configured to create a second color texture map from the detected second color value from a scan of the object at a second scanning angle. For example, the texture mapping module 406 may convert a color value detected from a scan of an object by the scanning module 402 into a 2-D image and store the color texture map 2-D image as texture map data in the database 110. In some embodiments, the texture map data 114 of the polygon mesh of the object may contain a color texture map for every angle at which the object is scanned. For example, with the user holding his or her head vertically, if the user's head is scanned in a pan around the user's head from −70 degrees to the side of the head-on view of the user's face to +70 degrees to the side of the head-on view of the user's face in 10 degree intervals, then the scan would include 15 reference viewpoints of the user's head, including a straight, head-on view of the user's face at 0 degrees. The scanning module 402 may then scan a pair of glasses from −70 degrees to +70 degrees to create 15 corresponding reference viewpoints of the glasses. Thus, in some embodiments, the texture mapping module 406 may create 15 color texture maps, one for each of the 15 corresponding reference viewpoints of the glasses. However, in some embodiments, the texture mapping module 406 may create a single shadow texture map and a single transparency map for the 15 corresponding reference viewpoints of the glasses. In some embodiments, the texture mapping module 406 may be configured to map a 2-D coordinate of the first color texture map to a point on the 3-D model of the user and a point on a 3-D polygon mesh of the object, which may be the same points associated with the application of the transparency texture map. Thus, in some configurations the texture mapping module 406 may be configured to multiply the result of multiplying the transparency texture map and the point on the 3-D model of the user and the 3-D polygon mesh of the object by the first color value. In other words, the texture mapping module 406 may first apply the transparency of the lens on a 3-D polygon mesh of a pair of glasses (i.e., merging the visible portion of the user with the transparent portion of the glasses) and then apply the color of the lens to that result.

In some embodiments, the texture mapping module 406 may be configured to apply a shadow texture map of an object to a 3-D model of a user. As explained above with reference to FIG. 5, the rendering module 104-a may position a 3-D polygon mesh of a pair of glasses on a 3-D model of a user's head in a manner that depicts the user wearing a pair of glasses. The shadow texture map of the 3-D polygon mesh of a pair of glasses may be applied to the face of a 3-D model of a user's head. Thus, the application of a shadow texture map may be based on the placement of the 3-D polygon mesh of the object in relation to the 3-D model of the user.

In some configurations the texture mapping module 406 may be configured to apply a transparency texture map of the object to backwards-facing polygons of the 3-D polygon mesh of the object. Applying the transparency values of backwards-facing triangles before front-facing triangles allows portions of the 3-D polygon mesh that would be visible through a transparent section of the mesh (i.e., the lenses) to be rendered before other portions of the 3-D polygon mesh that would block portions of the 3-D polygon mesh of the object and 3-D model of the user that would normally be viewable through the transparent section. For example, with a render viewpoint from the left of the user, a portion of the back of the frames of the 3-D polygon mesh of a pair of glasses may be visible through the lens. Rendering that portion of the back of the frames before the front portion allows that back portion to be visible through the lens following a rendering of the 3-D space.

In some embodiments, the texture mapping module 406 may be configured to apply a first color texture map of the object to the result of the application of the transparency texture map to the backwards-facing polygons. In some embodiments, the texture mapping module 406 may be configured to apply a transparency texture map of the object to front-facing polygons of the 3-D polygon mesh of an object. The texture mapping module 406 may be configured to apply a first color texture map of the object to the result of the application of the transparency texture mapped to the front-facing polygons. The rendering module 104-a may then render the 3-D space at the first render viewing angle. For example, the backward-facing polygons of the lens may be applied to combine the value of a pixel of the 3-D model of a user with the value of the lens directly in front of that pixel of the 3-D model of the user. Combining the pixel with the transparency value gives renders the lens as being transparent so that the portion of the user behind the lens is seen in the render. Having applied the transparency value to the 3-D model of the user, the texture mapping module 406 may apply the color texture map to the same point. In other words, if the lens is a brown lens, the color texture map may include color information of the brown lens. Thus, the texture mapping module 406 may apply the brown color to the same point on the 3-D model of the user where the transparency texture map was applied. The process may then be repeated for the same point on the 3-D model of the user with the front-facing polygons of the 3-D polygon mesh of the object, resulting in a rendered brown transparent lens through which the 3-D model of the user's eye may be seen once rendering completes.

In some embodiments, the text, the texture mapping module 406 may be configured to apply the shadow texture map of the object to a 3-D model of the user at the second render viewpoint. The texture mapping module 406 may be configured to apply the transparency texture map of the object to backwards-facing polygons of the 3-D polygon mesh of the object at the second render viewpoint and then apply the second color texture map to the 3-D polygon mesh of the object as a result of the application of the transparency texture map to the backwards-facing polygons at the second render viewpoint. In some embodiments, the texture mapping module 406 may be configured to apply the transparency texture map of an object to front-facing polygons of the 3-D polygon mesh of the object at the second render viewpoint and then apply the second color texture map of the object to the result of the application of the transparency texture mapped to the front-facing polygons at the second render viewing angle. The rendering module 104-a may then render the 3-D space at the second render viewing angle.

In some embodiments, the blurring module 410 may be configured to determine a first level and a second level of blur accuracy. For example, applying a blurring effect to a portion of the rendered 3-D space with a relatively high accuracy may require a correspondingly high amount of processing time. Attempting to apply the blurring effect with relatively high accuracy while the render viewpoint of the 3-D space is modified may introduce a lag in the rendering of the 3-D space. On the other hand, applying a blurring effect to a portion of the rendered 3-D space with a relatively low accuracy may require a correspondingly low amount of processing time, permitting a real-time rendering of the 3-D space with a blurring effect without introducing lag. In some configurations the blurring module 410 may be configured to determine a first level and a second level of blur intensity. In other words, in some embodiments, a relatively low level of blur may be applied to the entire rendered depiction of the object, whereas a relatively high level of blur may be applied to the edges of the rendered depiction of the object. For instance, the blurring module 410 may apply a relatively high level of a blurring effect to the edges of a rendered pair of glasses and a relatively low level of a blurring effect to the glasses overall. Thus, the blurring module 410 may be configured to apply the first level of blur accuracy at the first level of blur intensity to the rendered depiction of the object. In some embodiments, the edge detection module 412 may be configured to detect an edge of the rendered depiction of the object. The blurring module 410 may be configured to apply the first level of blur accuracy at the second level of blur intensity to the rendered depiction of the object. In some embodiments, upon receiving a user input to adjust the render viewpoint, the blurring module 410 may be configured to apply the second level of blur accuracy to the rendered depiction of the object.

In some configurations, the systems and methods described herein may be used to facilitate rendering a virtual try-on shopping experience. For example, a user may be presented with a pair of glasses (e.g., for the first time) via a rendered virtual try-on image that illustrates the pair of glasses on the user's face, thus, enabling a user to shop for glasses and to see how the user looks in the glasses (via the virtual try-on) simultaneously.

Figure 6:
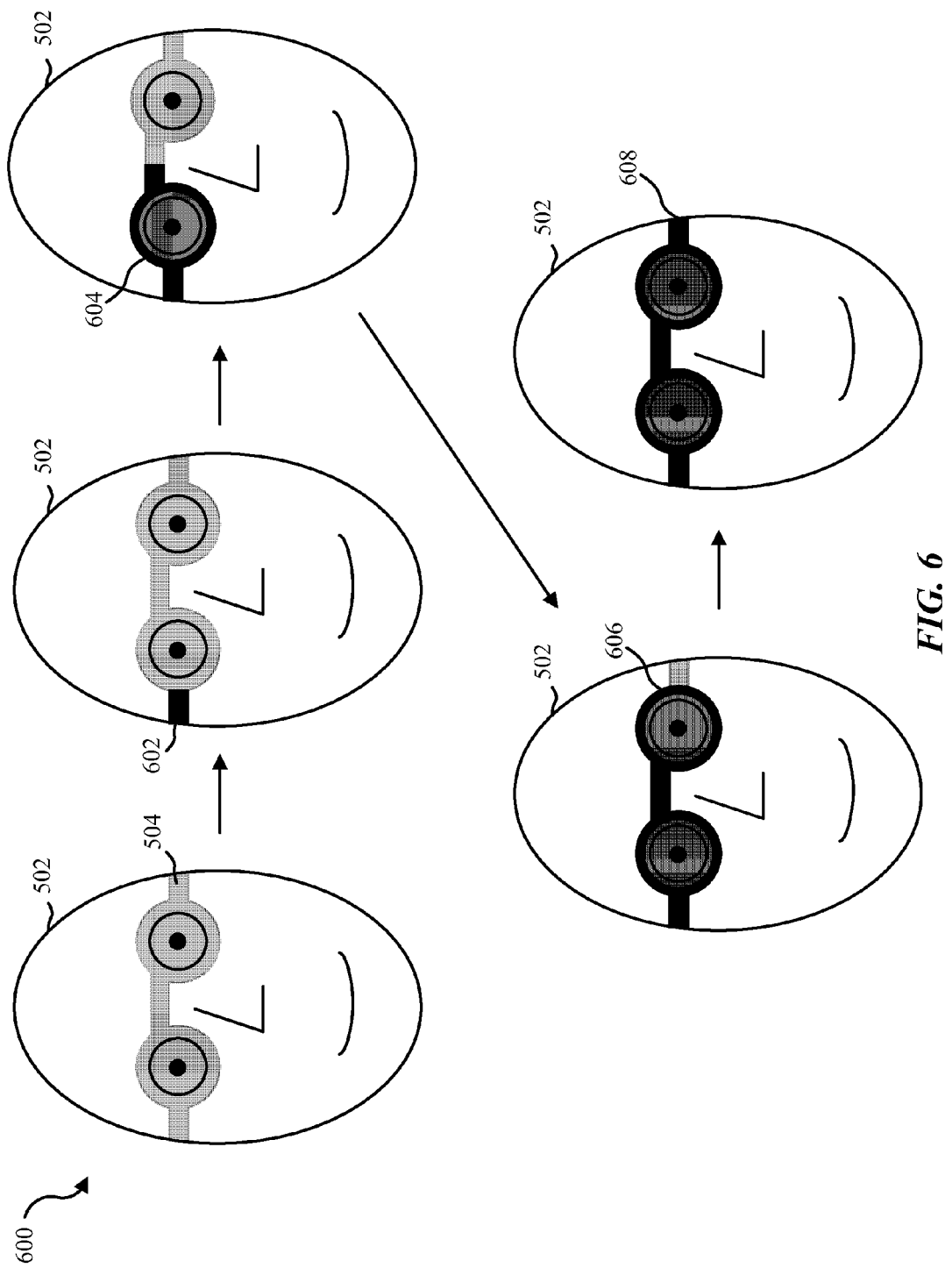
FIG. 6 illustrates another example arrangement of a virtual 3-D space.

FIG. 6 illustrates another example arrangement of a virtual 3-D space 600. FIG. 6 depicts different stages of the rendering process of the render module 402 from application of the shadow texture map, to the application of the transparency texture and color texture maps. The virtual 3-D space 600 includes a depiction of the 3-D model of the user 502 and the shadow texture map 504 similar to the depiction in FIG. 5. Additionally, FIG. 6 depicts texture maps associated with a 3-D polygon mesh of a pair of glasses, including the application of the color and transparency texture maps of the right arm 602, the application of the color and transparency texture maps of the right lens and frame 604, the application of the col- or and transparency texture maps of the left lens and frame 606, and the application of the color and transparency texture maps of the left arm 608. Thus, as depicted, with the shadow texture map 504 applied to the 3-D model of the user 502, the texture mapping module 406 may be configured to apply the combination of the transparency and color texture maps 602 to the 3-D polygon model of a pair of glasses to render a virtual 3-D view of the user wearing a particular model of glasses.

Figure 7:
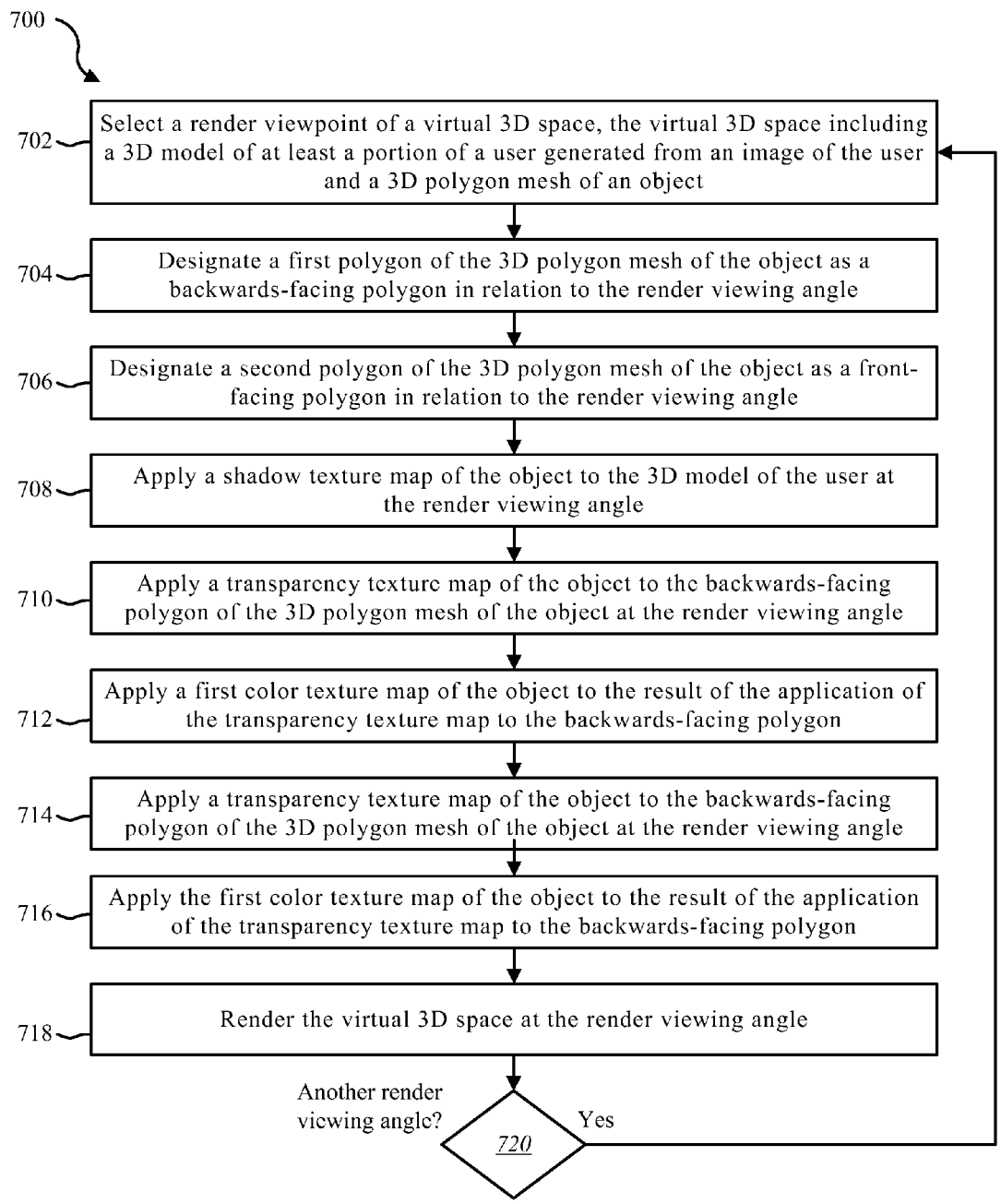
FIG. 7 is a flow diagram illustrating one embodiment of a method to render a virtual 3-D space.

FIG. 7 is a flow diagram illustrating one embodiment of a method 700 to render a virtual 3-D space. In some configurations, the method 700 may be implemented by the rendering module 104 illustrated in FIG. 1, 2, or 4. In some configurations, the method 700 may be implemented by the application 202 illustrated in FIG. 2.

At block 702, a render viewpoint of a virtual 3-D space may be selected. The virtual 3-D space may include a 3-D model of at least a portion of a user generated from an image of the user and a 3-D polygon mesh of an object. At block 704, a first polygon of the 3-D polygon mesh of the object may be designated as a backwards-facing polygon in relation to the render viewing angle. At block 706, a second polygon of the 3-D polygon mesh of the object may be designated as a front-facing polygon in relation to the render viewing angle.

At block 708, a shadow texture map of the object may be applied to the 3-D model of the user at the render viewing angle. At block 710, a transparency texture map of the object may be applied to the backwards-facing polygon of the 3-D polygon mesh of the object at the render viewing angle. At block 712, a first color texture map of the object may be applied to the result of the application of the transparency texture map to the backwards-facing polygon.

At block 714, a transparency texture map of the object may be applied to the backwards-facing polygon of the 3-D polygon mesh of the object at the render viewing angle. At block 716, the first color texture map of the object may be applied to the result of the application of the transparency texture map to the backwards-facing polygon. At block 718, the virtual 3-D space may be rendered at the render viewing angle. At block 720, a determination may be made whether there is another viewing angle to render. If it is determined that there is another viewing angle to render, then the method 700 returns to block 702.

Figure 8:
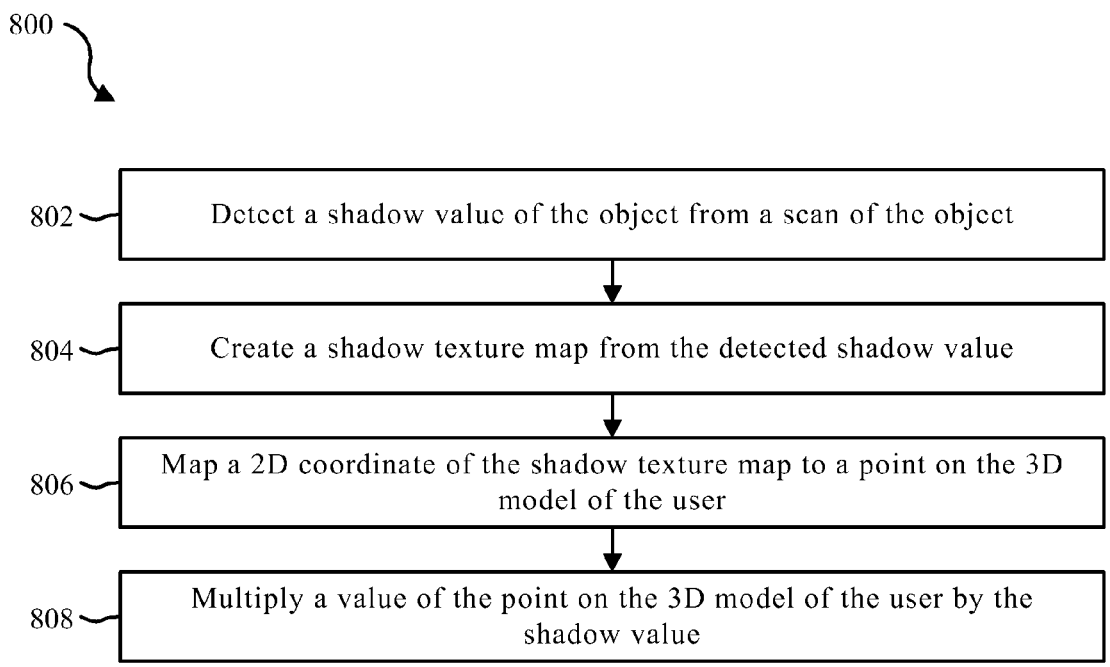
FIG. 8 is a flow diagram illustrating one embodiment of a method to create a shadow texture map.

FIG. 8 is a flow diagram illustrating one embodiment of a method 800 to create a shadow texture map. In some configurations, the method 800 may be implemented by the rendering module 104 illustrated in FIG. 1, 2, or 4. In some configurations, the method 800 may be implemented by the application 202 illustrated in FIG. 2.

At block 802, a shadow value of an object may be detected from a scan of the object. At block 804, a shadow texture map may be created from the detected shadow value. At block 806, a 2-D coordinate of the shadow texture map may be mapped to a point on the 3-D model of the user. At block 808, a value of the point on the 3-D model of the user may be multiplied by the shadow value.

Figure 9:
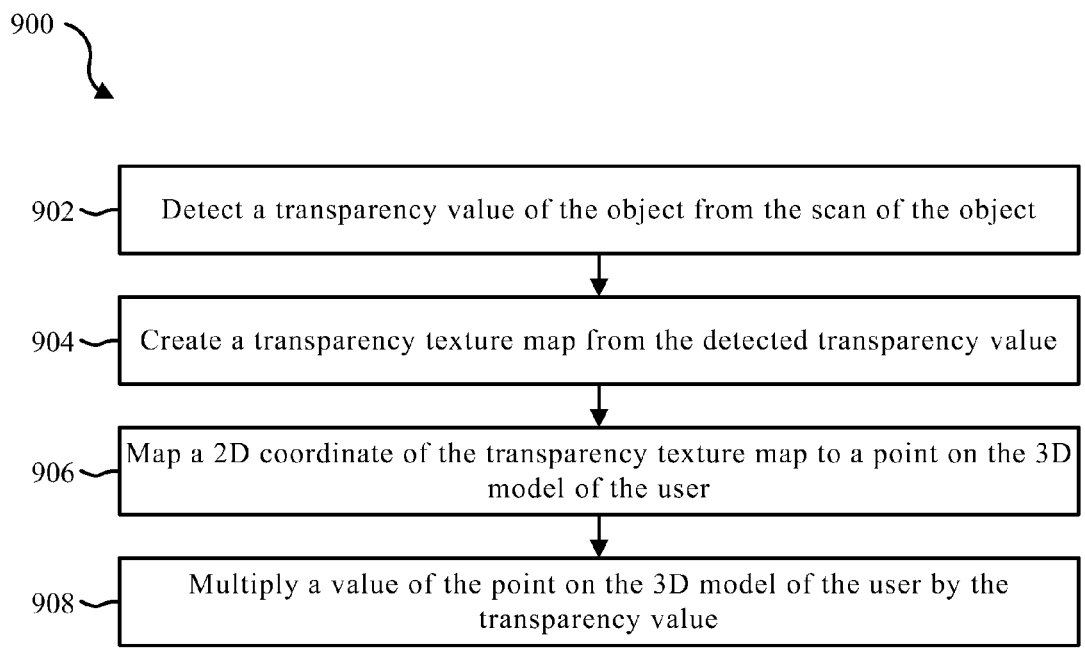
FIG. 9 is a flow diagram illustrating one embodiment of a method to create a transparency texture map.

FIG. 9 is a flow diagram illustrating one embodiment of a method 900 to create a transparency texture map. In some configurations, the method 900 may be implemented by the rendering module 104 illustrated in FIG. 1, 2, or 4. In some configurations, the method 900 may be implemented by the application 202 illustrated in FIG. 2.

At block 902, a transparency value of an object may be detected from a scan of the object. At block 904, a transparency texture map may be created from the detected transparency value. At block 906, a 2-D coordinate of the transparency texture map may be mapped to a point on the 3-D model of the user. At block 908, a value of the point on the 3-D model of the user may be multiplied by the transparency value.

Figure 10:
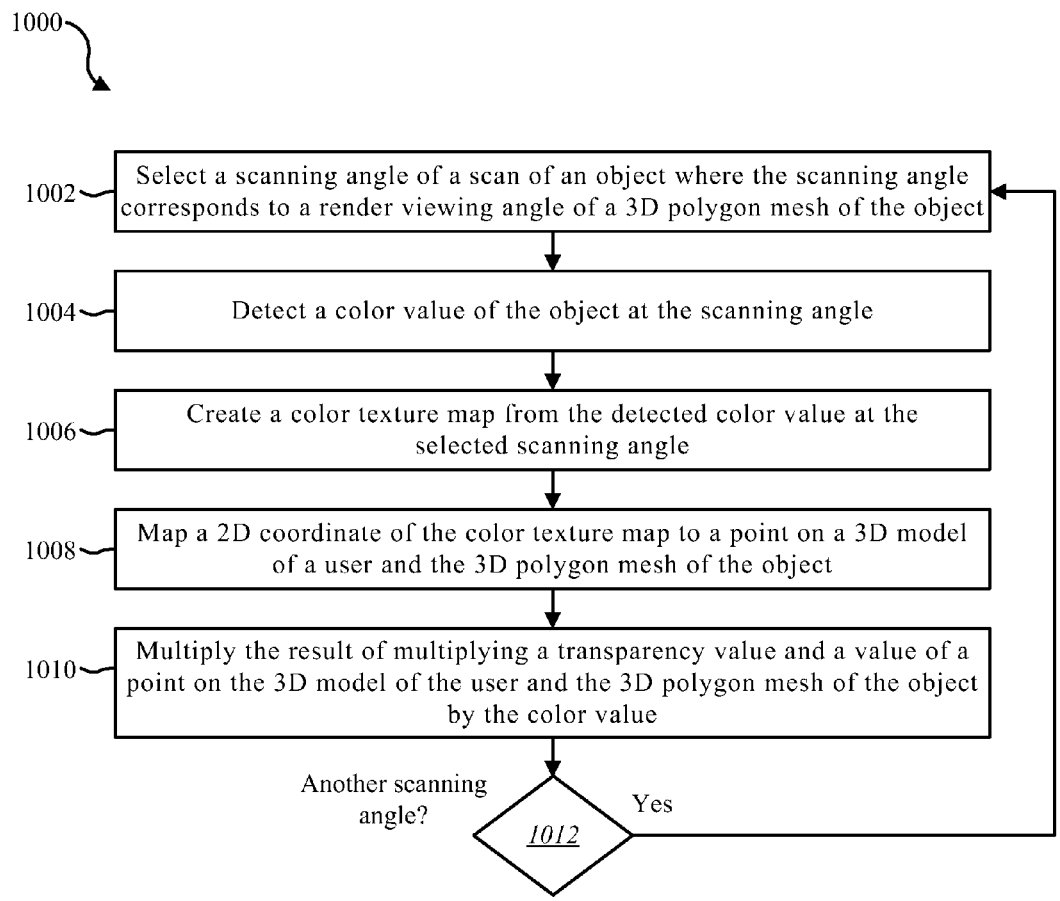
FIG. 10 is a flow diagram illustrating one embodiment of a method to create a color texture map.

FIG. 10 is a flow diagram illustrating one embodiment of a method 1000 to create a color texture map. In some configurations, the method 1000 may be implemented by the rendering module 104 illustrated in FIG. 1, 2, or 4. In some configurations, the method 1000 may be implemented by the application 202 illustrated in FIG. 2.

At block 1002, a scanning angle of a scan of an object may be selected. The scanning angle may correspond to a render viewing angle of a 3-D polygon mesh of the object. At block 1004, a color value of an object may be detected from a scan of the object. At block 1006, a color texture map may be created from the detected color value. At block 1008, a 2-D coordinate of the color texture map may be mapped to a point on the 3-D model of the user. At block 1010, a value of the point on the 3-D model of the user may be multiplied by the color value. At block 1012, a determination may be made whether there is another scanning angle to process. If it is determined that there is another scanning angle to process, then the method 1000 returns to block 1002.

Figure 11:
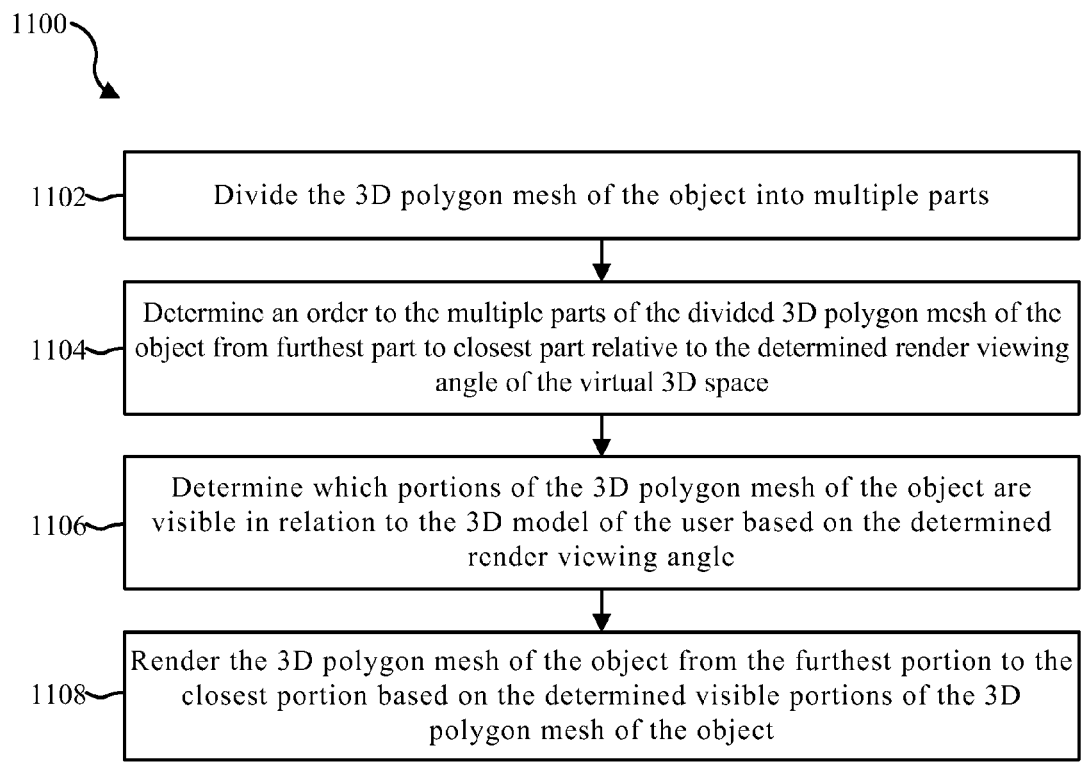
FIG. 11 is a flow diagram illustrating another embodiment of a method to render the virtual 3-D space.

FIG. 11 is a flow diagram illustrating another embodiment of a method 1100 to render the virtual 3-D space. In some configurations, the method 1100 may be implemented by the rendering module 104 illustrated in FIG. 1, 2, or 4. In some configurations, the method 1100 may be implemented by the application 202 illustrated in FIG. 2.

At block 1102, the 3-D polygon mesh of the object may be divided into multiple parts. At block 1104, an order may be determined to the multiple parts of the divided 3-D polygon mesh of the object from furthest part to closest part relative to the determined render viewing angle of the virtual 3-D space.

At block 1106, it is determined which portions of the 3-D polygon mesh of the object are visible in relation to the 3-D model of the user based on the determined render viewing angle. At block 1108, the 3-D polygon mesh of the object is rendered from the furthest part to the closest part based on the determined visible portions of the 3-D polygon mesh of the object.

Figure 12:
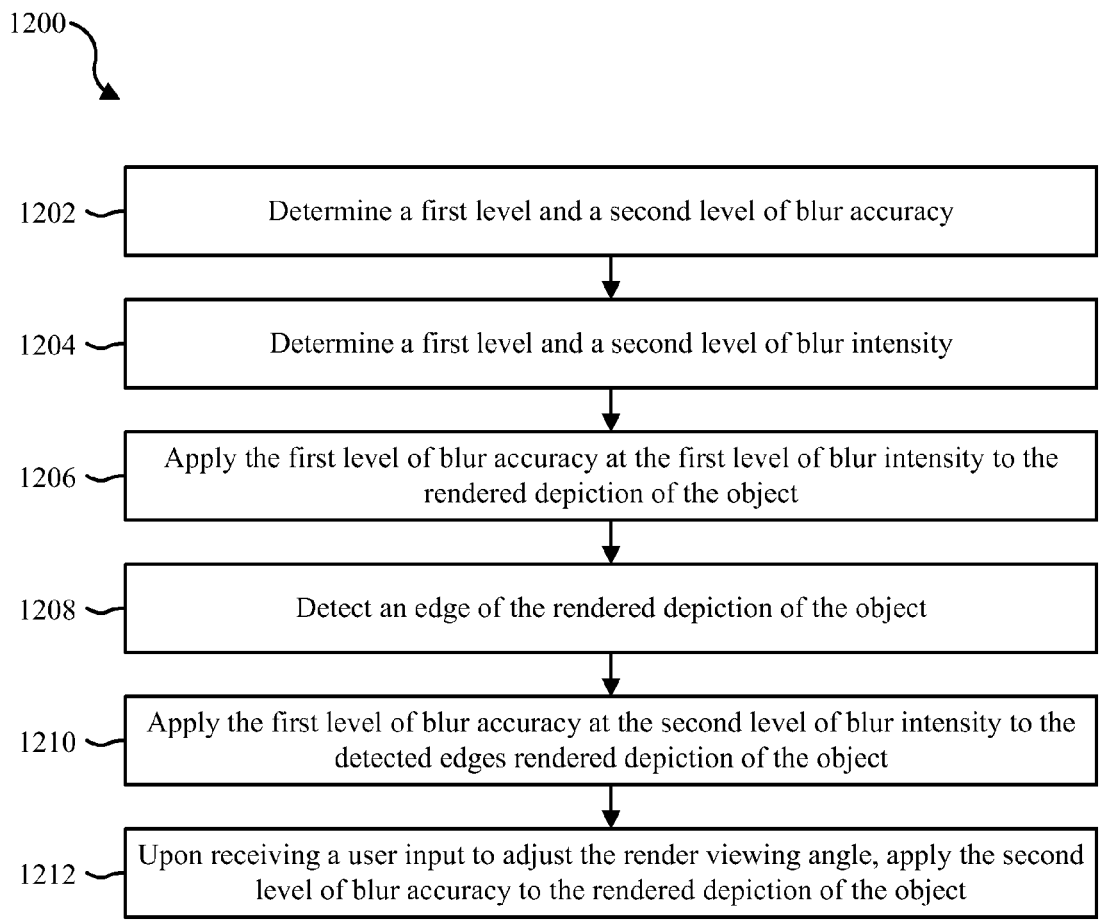
FIG. 12 is a flow diagram illustrating one embodiment of a method to apply a blurring effect to a rendered depiction of the object.

FIG. 12 is a flow diagram illustrating one embodiment of a method 1200 to apply a blurring effect to a rendered depiction of the object. In some configurations, the method 1200 may be implemented by the rendering module 104 illustrated in FIG. 1, 2, or 4. In some configurations, the method 1200 may be implemented by the application 202 illustrated in FIG. 2.

At block 1202, a first level and a second level of blur accuracy may be determined. At block 1204, a first level and a second level of blur intensity may be determined. At block 1206, the first level of blur accuracy may be applied at the first level of blur intensity to the rendered depiction of the object. At block 1208, an edge of the rendered depiction of the object may be detected. At block 1210, the first level of blur accuracy may be applied at the second level of blur intensity to the detected edges of the rendered depiction of the object. At block 1212, upon receiving a user input to adjust the render viewing angle, the second level of blur accuracy is applied to the rendered depiction of the object.

Figure 13:
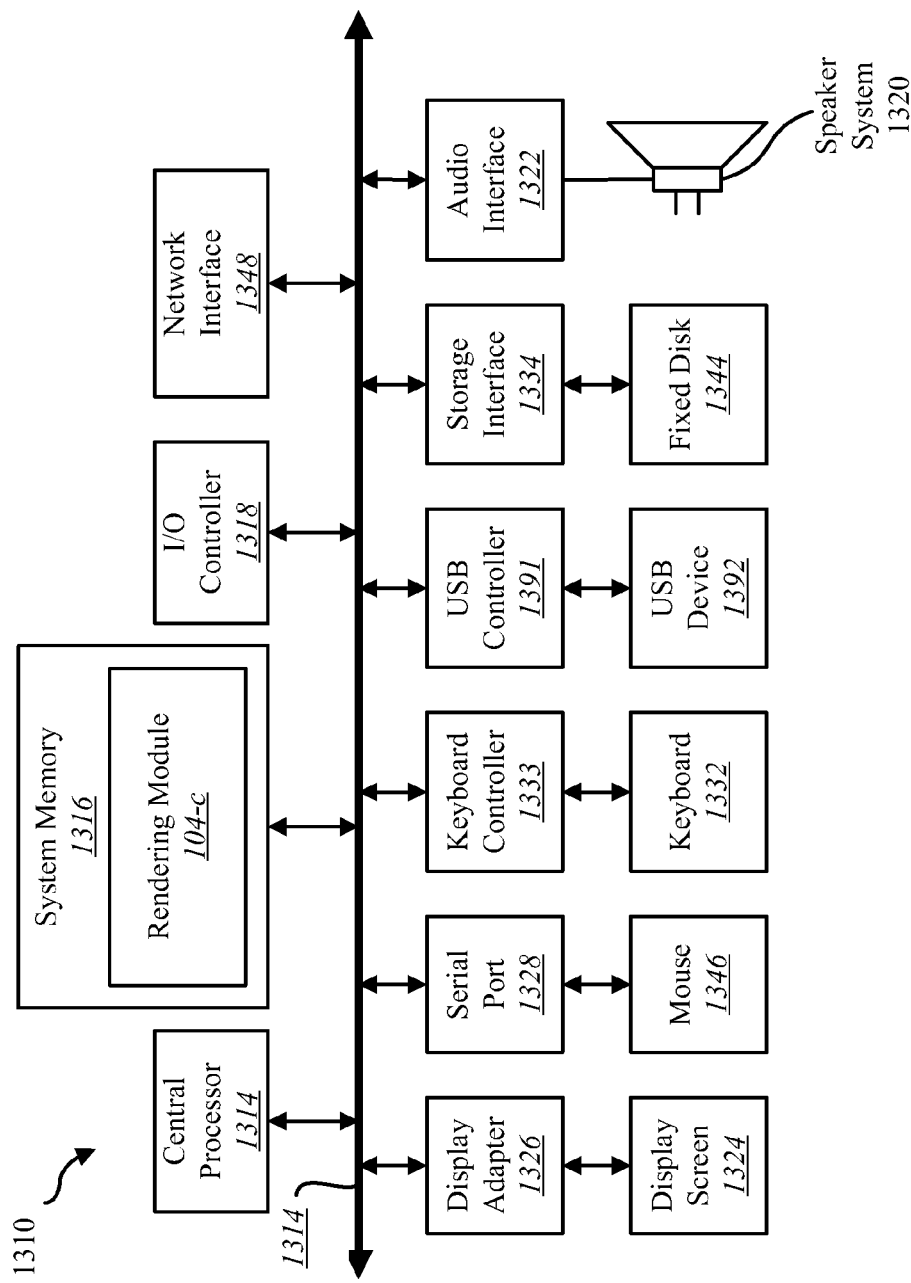
FIG. 13 depicts a block diagram of a computer system suitable for implementing the present systems and methods.

FIG. 13 depicts a block diagram of a computer system 1300 suitable for implementing the present systems and methods. Computer system 1310 includes a bus 1312 which interconnects major subsystems of computer system 1310, such as a central processor 1314, a system memory 1316 (typically RAM, but which may also include ROM, flash RAM, or the like), an input/output controller 1318, an external audio device, such as a speaker system 1320 via an audio output interface 1322, an external device, such as a display screen 1324 via display adapter 1326, an keyboard 1332 (interfaced with a keyboard controller 1333) (or other input device), multiple USB devices 1392 (interfaced with a USB controller 1391), and a storage interface 1334. Also included are a mouse 1346 (or other point-and-click device) and a network interface 1348 (coupled directly to bus 1312).

Bus 1312 allows data communication between central processor 1314 and system memory 1316, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the rendering module 104-c to implement the present systems and methods may be stored within the system memory 1316. Applications (e.g., application 202) resident with computer system 1310 are generally stored on and accessed via a non-transitory computer readable medium, such as a hard disk drive (e.g., fixed disk 1344) or other storage medium. Additionally, applications can be in the form of electronic signals modulated in accordance with the application and data communication technology when accessed via interface 1348.

Storage interface 1334, as with the other storage interfaces of computer system 1310, can connect to a standard computer readable medium for storage and/or retrieval of information, such as a fixed disk drive 1344. Fixed disk drive 1344 may be a part of computer system 1310 or may be separate and accessed through other interface systems. Network interface 1348 may provide a direct connection to a remote server via a direct network link to the Internet via a POP (point of presence). Network interface 1348 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 13 need not be present to practice the present systems and methods. The devices and subsystems can be interconnected in different ways from that shown in FIG. 13. The operation of a computer system such as that shown in FIG. 13 is readily known in the art and is not discussed in detail in this application. Code to implement the present disclosure can be stored in a non-transitory computer-readable medium such as one or more of system memory 1316 or fixed disk 1344. The operating system provided on computer system 1310 may be iOS®, MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for rendering virtual try-on products, the method comprising:
    selecting, via a processor, a first render viewpoint of a virtual 3-D space, wherein the virtual 3-D space comprises a 3-D model of at least a portion of a user generated from an image of the user and a 3-D polygon mesh representative of a real world object, wherein the object comprises at least one of clothing, footwear, glasses, jewelry, accessories, and hair styles;
    designating, via the processor, a first set comprising at least one polygon of the 3-D polygon mesh of the object as a backwards-facing polygon in relation to the first render viewpoint;
    designating, via the processor, a second set comprising at least one polygon of the 3-D polygon mesh of the object as a front-facing polygon in relation to the first render viewpoint;
    applying, via the processor, a shadow texture map of the object to the 3-D model of the user;
    applying, via the processor, a transparency texture map of the object to the backwards-facing polygon of the 3-D polygon mesh of the object;
    applying, via the processor, a first color texture map of the object to the result of the application of the transparency texture map to the backwards-facing polygon; and
    rendering, via the processor, the virtual 3-D space at the first render viewpoint including both the 3-D model of at least a portion of a user and the 3-D polygon mesh of an object.

2. The method of claim 1, further comprising:
    applying the transparency texture map of the object to the front-facing polygon of the 3-D polygon mesh of the object; and
    applying the first color texture map of the object to the result of the application of the transparency texture map to the front-facing polygon.

3. The method of claim 1, further comprising:
    placing at least a portion of the 3-D polygon mesh of the object within a predetermined distance of at least one point on the 3-D model of the user, wherein the application of the shadow texture map is based on the position of the 3-D polygon mesh of the object in relation to the 3-D model of the user.

4. The method of claim 1, further comprising:
    detecting a shadow value of the object from a scan of the object; and
    creating the shadow texture map from the detected shadow value.

5. The method of claim 4, further comprising:
    mapping a 2-D coordinate of the shadow texture map to a point on the 3-D model of the user; and
    multiplying a value of the point on the 3-D model of the user by the shadow value.

6. The method of claim 1, further comprising:
    detecting a transparency value of the object from a scan of the object; and
    creating the transparency texture map from the detected transparency value.

7. The method of claim 6, further comprising:
    mapping a 2-D coordinate of the transparency texture map to a point on the 3-D model of the user and the 3-D polygon mesh of the object; and
    multiplying a value of the point on the 3-D model of the user by the transparency value.

8. The method of claim 7, further comprising:
    selecting a first scanning angle of a scan of an object, wherein the first scanning angle corresponds to the first render viewpoint;
    detecting a first color value of the object at the first scanning angle;
    creating the first color texture map from the detected first color value.

9. The method of claim 8, further comprising:
    mapping a 2-D coordinate of the first color texture map to the point on the 3-D model of the user and the 3-D polygon mesh of the object; and
        multiplying the resultant value of the point on the 3-D model of the user and the 3-D polygon mesh of the object by the first color value.

10. The method of claim 1, further comprising:
    selecting a second render viewpoint of the virtual 3-D space.

11. The method of claim 10, further comprising:
    selecting a second scanning angle of a scan of an object, wherein the second scanning angle corresponds to the second render viewpoint;
    detecting a second color value of the object at the second scanning angle; and
    creating a second color texture map from the detected second color value.

12. The method of claim 10, further comprising:
    applying the shadow texture map of the object to the 3-D model of the user at the second render viewpoint;
    applying the transparency texture map of the object to the backwards-facing polygon of the 3-D polygon mesh of the object at the second render viewpoint; and
    applying the second color texture map of the object to the result of the application of the transparency texture map to the backwards-facing polygon at the second render viewpoint.

13. The method of claim 10, further comprising:
applying the transparency texture map of the object to the front-facing polygon of the 3-D polygon mesh of the object at the second render viewpoint; and
applying the second color texture map of the object to the result of the application of the transparency texture map to the front-facing polygon at the second render viewpoint;
rendering the virtual 3-D space at the second render viewpoint.

14. The method of claim 1, further comprising:
dividing the 3-D polygon mesh of the object into two or more portions;
determining an order to the portions of the divided 3-D polygon mesh of the object from furthest portion to closest portion relative to the determined render viewpoint of the virtual 3-D space;
rendering the 3-D polygon mesh of the object from the furthest portion to the closest portion.

15. The method of claim 1, further comprising:
determining whether a portion of the 3-D polygon mesh of the object is visible in relation to the 3-D model of the user based on the determined render viewpoint, wherein rendering the scene comprises rendering the scene based on a visible portion of the 3-D polygon mesh of the object.

16. The method of claim 1, further comprising:
determining a first level and a second level of blur accuracy;
determining a first level and a second level of blur intensity; and
applying the first level of blur accuracy at the first level of blur intensity to the rendered depiction of the object.

17. The method of claim 16, further comprising:
detecting an edge of the rendered depiction of the object; and
applying the first level of blur accuracy at the second level of blur intensity to the rendered depiction of the object.

18. The method of claim 16, further comprising:
upon receiving a user input to adjust the render viewpoint, applying the second level of blur accuracy to the rendered depiction of the object.

19. A computing device configured to render virtual try-on products, comprising:
a processor;
memory in electronic communication with the processor;
instructions stored in the memory, the instructions being executable by the processor to:
select a first render viewpoint of a virtual 3-D space, wherein the virtual 3-D space comprises a 3-D model of at least a portion of a user generated from an image of the user and a 3-D polygon mesh of a real world object, wherein the object comprises at least one of clothing, footwear, glasses, jewelry, accessories, and hair styles;
designate a first set comprising at least one polygon of the 3-D polygon mesh of the object as a backwards-facing polygon in relation to the first render viewpoint;
designate a second set comprising at least one polygon of the 3-D polygon mesh of the object as a front-facing polygon in relation to the first render viewpoint;
apply a shadow texture map of the object to the 3-D model of the user;
apply a transparency texture map of the object to the backwards-facing polygon of the 3-D polygon mesh of the object;
apply a first color texture map of the object to the result of the application of the transparency texture map to the backwards-facing polygon; and
render the virtual 3-D space at the first render viewpoint including both the 3-D model of at least a portion of a user and the 3-D polygon mesh of an object.

20. The computing device of claim 19, wherein the instructions are executable by the processor to:
apply the transparency texture map of the object to the front-facing polygon of the 3-D polygon mesh of the object; and
apply the first color texture map of the object to the result of the application of the transparency texture map to the front-facing polygon.

21. The computing device of claim 19, wherein the instructions are executable by the processor to:
detect a shadow value of the object from a scan of the object; and
create the shadow texture map from the detected shadow value.

22. The computing device of claim 21, wherein the instructions are executable by the processor to:
map a 2-D coordinate of the shadow texture map to a point on the 3-D model of the user; and
multiply a value of the point on the 3-D model of the user by the shadow value.

23. The computing device of claim 19, wherein, upon determining the first application is a trusted application, the instructions are executable by the processor to:
detect a transparency value of the object from a scan of the object; and
create the transparency texture map from the detected transparency value.

24. The computing device of claim 23, wherein the instructions are executable by the processor to:
map a 2-D coordinate of the transparency texture map to a point on the 3-D model of the user and the 3-D polygon mesh of the object; and
multiply a value of the point on the 3-D model of the user by the transparency value.

25. The computing device of claim 24, wherein the instructions are executable by the processor to:
select a first scanning angle of a scan of an object where the scanning angle corresponds to the first render viewpoint;
detect a first color value of the object at the first scanning angle;
create the first color texture map from the detected first color value.

26. The computing device of claim 25, wherein the instructions are executable by the processor to:
map a 2-D coordinate of the first color texture map to the point on the 3-D model of the user and the 3-D polygon mesh of the object; and
multiply the resultant value of the point on the 3-D model of the user and the 3-D polygon mesh of the object by the first color value.

27. The computing device of claim 19, wherein the instructions are executable by the processor to:
select a second render viewpoint of the virtual 3-D space.

28. The computing device of claim 27, wherein the instructions are executable by the processor to:
select a second scanning angle of a scan of an object, wherein the second scanning angle corresponds to the second render viewpoint;

detect a second color value of the object at the second scanning angle; and create a second color texture map from the detected second color value.

29. The computing device of claim 27, wherein the instructions are executable by the processor to:

apply the shadow texture map of the object to the 3-D model of the user at the second render viewpoint;

apply the transparency texture map of the object to the backwards-facing polygon of the 3-D polygon mesh of the object at the second render viewpoint; and apply the second color texture map of the object to the result of the application of the transparency texture map to the backwards-facing polygon at the second render viewpoint.

30. The computing device of claim 27, wherein the instructions are executable by the processor to:

apply the transparency texture map of the object to the front-facing polygon of the 3-D polygon mesh of the object at the second render viewpoint;

apply the second color texture map of the object to the result of the application of the transparency texture map to the front-facing polygon at the second render viewpoint; and render the virtual 3-D space at the second render viewpoint.

31. The computing device of claim 19, wherein the instructions are executable by the processor to:

divide the 3-D polygon mesh of the object into two or more portions;

determine an order to the portions of the divided 3-D polygon mesh of the object from furthest portion to closest portion relative to the determined render viewpoint of the virtual 3-D space;

render the 3-D polygon mesh of the object from the furthest portion to the closest portion.

32. The computing device of claim 19, wherein the instructions are executable by the processor to:

determine whether a portion of the 3-D polygon mesh of the object is visible in relation to the 3-D model of the user based on the determined render viewpoint, wherein the instruction to render the scene comprises an instruction to render the scene based on a visible portion of the 3-D polygon mesh of the object.

33. The computing device of claim 19, wherein the instructions are executable by the processor to:

determine a first level and a second level of blur accuracy;

determine a first level and a second level of blur intensity; and apply the first level of blur accuracy at the first level of blur intensity to the rendered depiction of the object.

34. The computing device of claim 33, wherein the instructions are executable by the processor to:

detect an edge of the rendered depiction of the object; and apply the first level of blur accuracy at the second level of blur intensity to the rendered depiction of the object.

35. The computing device of claim 33, wherein the instructions are executable by the processor to:

upon receiving a user input to adjust the render viewpoint, apply the second level of blur accuracy to the rendered depiction of the object.

36. A computer-program product for rendering virtual try-on products, the computer-program product comprising a non-transitory computer-readable medium storing instructions thereon, the instructions being executable by a processor to:

select a first render viewpoint of a virtual 3-D space, wherein the virtual 3-D space comprises a 3-D model of at least a portion of a user generated from an image of the user and a 3-D polygon mesh of a real world object, wherein the object comprises at least one of clothing, footwear, glasses, jewelry, accessories, and hair styles;

designate a first set comprising at least one polygon of the 3-D polygon mesh of the object as a backwards-facing polygon in relation to the first render viewpoint;

designate a second set comprising at least one polygon of the 3-D polygon mesh of the object as a front-facing polygon in relation to the first render viewpoint;

apply a shadow texture map of the object to the 3-D model of the user;

apply a transparency texture map of the object to the backwards-facing polygon of the 3-D polygon mesh of the object;

apply a first color texture map of the object to the result of the application of the transparency texture map to the backwards-facing polygon;

apply the transparency texture map of the object to the front-facing polygon of the 3-D polygon mesh of the object; and apply the first color texture map of the object to the result of the application of the transparency texture map to the front-facing polygon render the virtual 3-D space at the first render viewpoint including both the 3-D model of at least a portion of a user and the 3-D polygon mesh of an object.

37. The computer-program product of claim 36, wherein the instructions are executable by the processor to:

select a second render viewpoint of the virtual 3-D space;

select a first scanning angle of a scan of an object where the scanning angle corresponds to the first render viewpoint;

detect a second color value of the object from a scan of the object;

create a second color texture map from the detected second color value, wherein the second color texture map corresponds to the second render viewpoint;

apply the shadow texture map of the object to the 3-D model of the user at the second render viewpoint;

apply the transparency texture map of the object to the backwards-facing polygon of the 3-D polygon mesh of the object at the second render viewpoint;

apply the second color texture map of the object to the result of the application of the transparency texture map to the backwards-facing polygon at the second render viewpoint;

apply the transparency texture map of the object to the front-facing polygon of the 3-D polygon mesh of the object at the second render viewpoint; and apply the second color texture map of the object to the result of the application of the transparency texture map to the front-facing polygon at the second render viewpoint; and render the virtual 3-D space at the second render viewpoint.

38. The computer-program product of claim 36, wherein the instructions are executable by the processor to:

determine a first level and a second level of blur accuracy;

determine a first level and a second level of blur intensity; and apply the first level of blur accuracy at the first level of blur intensity to the rendered depiction of the object.

39. The computer-program product of claim 38, wherein the instructions are executable by the processor to:

detect an edge of the rendered depiction of the object; and apply the first level of blur accuracy at the second level of blur intensity to the rendered depiction of the object.

40. The computer-program product of claim 38, wherein the instructions are executable by the processor to:
upon receiving a user input to adjust the render viewpoint, apply the second level of blur accuracy to the rendered depiction of the object.

\* \* \* \* \*